(12) United States Patent
Fukui

(10) Patent No.: US 7,420,691 B2
(45) Date of Patent: Sep. 2, 2008

(54) METHOD AND APPARATUS FOR MEASURING INTERFACIAL POSITIONS, METHOD AND APPARATUS FOR MEASURING LAYER THICKNESS, AND METHOD AND APPARATUS FOR MANUFACTURING OPTICAL DISCS

(75) Inventor: Atsushi Fukui, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 72 days.

(21) Appl. No.: 11/640,907

(22) Filed: Dec. 19, 2006

(65) Prior Publication Data

US 2007/0153298 A1   Jul. 5, 2007

(30) Foreign Application Priority Data

Dec. 22, 2005   (JP) .............................. 2005-369635

(51) Int. Cl.
*G01B 11/06* (2006.01)
*G01J 3/42* (2006.01)

(52) U.S. Cl. ...................................... 356/632; 356/630
(58) Field of Classification Search ................. 356/632, 356/630
See application file for complete search history.

(56) References Cited

U.S. PATENT DOCUMENTS 4,640,620 A * 2/1987 Schmidt ..................... 356/609
6,151,119 A * 11/2000 Campion et al. ............ 356/630
6,762,838 B2 * 7/2004 Du-Nour ..................... 356/632
2005/0157614 A1 * 7/2005 Ichimura et al. ......... 369/44.27

FOREIGN PATENT DOCUMENTS

JP          8-160306          6/1996

OTHER PUBLICATIONS

Tadao Tsuruta, "*Applied Optics I*", published by Baifukan, pp. 296, lines 9-13, issued Jul. 20, 1990.

* cited by examiner

*Primary Examiner*—Gregory J Toatley, Jr.
*Assistant Examiner*—Rebecca C Slomski
(74) *Attorney, Agent, or Firm*—Wenderoth, Lind & Ponack, L.L.P.

(57) ABSTRACT

An interfacial position measuring method for a substrate internally having a plurality of interfaces parallel to one another. A light-convergent line which has converged in only a one-axis direction out of parallel light having an optical axis vertical to the substrate surface is formed so as to be inclined with respect to the substrate surface, and the light-convergent line is made to intersect with the substrate. Out of reflected light of the light-convergent line reflected by the substrate, a position having a light intensity peak is taken as an interface, by which a plurality of interfaces inside the substrate can be measured simultaneously and high-speed interfacial position measurement can be achieved.

19 Claims, 23 Drawing Sheets

METHOD AND APPARATUS FOR MEASURING INTERFACIAL POSITIONS, METHOD AND APPARATUS FOR MEASURING LAYER THICKNESS, AND METHOD AND APPARATUS FOR MANUFACTURING OPTICAL DISCS

BACKGROUND OF THE INVENTION

1. Field of the Invention

The present invention relates to an interfacial position measuring method and apparatus for measuring a plurality of interfacial positions within a transparent substrate, which is formed by laminating a plurality of layers, by using an optical system. The present invention also relates to a layer thickness measuring method and apparatus for measuring a layer thickness by using measuring such a plurality of interfacial positions, as well as to an optical disc manufacturing method and apparatus for manufacturing optical discs by executing layer thickness measurement.

2. Description of the Related Art

By virtue of the adoption of blue lasers as a recording light source, optical discs such as HD-DVDs or BD (Blu-ray Discs) have been increasing more and more. Together with this trend, there have been being advanced enhancement of the recording density by shortened wavelengths of laser sources used for recording on the optical disc as well as further multilayering of optical disc recording surfaces aimed at larger capacities. Also, as a result of rotation of an optical disc, an inclination or a warp occurs to the optical disc. With a view to ensuring the operation stability against the inclination or warp, the cover layer of the optical disc through which light is transmitted has been going extremely thin. Under such circumstances, a technique for measuring interfaces between individual layers with high accuracy has been desired to fulfill layer thickness control (film thickness control) of optical discs with high accuracy.

As a conventional interfacial position measuring apparatus, there is provided, for example, a confocal optical microscope of Japanese unexamined patent publication No. H08-160306 A (hereinafter, referred to as Document 1). FIG. 37 is a view showing an apparatus configuration using the conventional optical microscope described in Document 1.

Referring to FIG. 37, in the conventional interfacial position measuring apparatus, first, light from a laser source 210 is formed into a point light source by an fθ lens 213, and applied to a sample surface 230 via an image-forming lens 217 and an objective lens 218. Then, in a confocal optical system, reflected light from the sample surface 230 is received by a one-dimensional image sensor 219 placed at a focal position of the image-forming lens 217. For depth measurement of the sample in this measuring apparatus, a galvano mirror 212 placed within the confocal optical system is driven so that a laser spot focused on a focal plane of the objective lens 218 is moved linearly, by which the sample is scanned. In this case, if there is an interface on the scan line of the laser spot, an optical peak of reflected light occurs at a position corresponding to the one-dimensional image sensor 219. Using this optical peak allows the interface to be measured. Under the progress of scanning with the laser beam by means of the galvano mirror 212, the interface of the sample is measured by moving the sample in height in small steps from below to above, layer thickness and configuration of the sample in a cross-sectional direction can be measured.

SUMMARY OF THE INVENTION

Nowadays, BDs or other optical discs have been being advanced toward increasingly larger multiplicities of layers, giving rise to a keen desire for high-speed measurement. However, with the constitution of the conventional interfacial position measuring apparatus described in Document 1, for which it is necessary to perform the measurement while moving the sample in the vertical direction, bearing an issue that high-speed measurement is hardly achievable.

Accordingly, the present invention is purposed to solve these and other problems. For this purpose, the object of the invention is to provide an interfacial position measuring method and measuring apparatus, as well as a layer thickness measuring method and measuring apparatus and an optical disc manufacturing method and apparatus, capable of measuring interfacial positions inside a sample with high speed in interfacial position measurement for measuring a plurality of interfacial positions within a transparent substrates, which is formed by laminating a plurality of layers, by using an optical system.

In accomplishing these and other objects, according to a first aspect of the present invention, there is provided an interfacial position measuring method comprising:

emitting light to a substrate in which a plurality of optically transparent layers are laminated;

placing a plurality of light-convergent points formed by the said emitted light onto different coordinates, respectively, in an X direction parallel to a surface of the substrate and a Z direction vertical to the surface of the substrate; and then, measuring light intensities of reflected light of the said emitted light and reflected within the substrate, and determining a position having a light intensity exceeding a threshold value as an interfacial position between the layers.

According to a second aspect of the present invention, there is provided the interfacial position measuring method as defined in the first aspect, wherein the plurality of light-convergent points formed by the said emitted light are placed at even intervals in the Z direction.

According to a third aspect of the present invention, there is provided the interfacial position measuring method as defined in the first aspect, wherein the light-convergent points formed by the emitted light are placed at their respective positions separate from the substrate in the Z direction, at least one light-convergent point for each one position.

According to a fourth aspect of the present invention, there is provided the interfacial position measuring method as defined in the first aspect, wherein the plurality of light-convergent points are so placed that an optical path length of the emitted light becomes equal among all the plurality of light-convergent points.

According to a fifth aspect of the present invention, there is provided the interfacial position measuring method as defined in the first aspect, wherein a linear light-convergent point array formed by the plurality of light-convergent points is placed so as to intersect the layers.

According to a sixth aspect of the present invention, there is provided the interfacial position measuring method as defined in the first aspect, wherein the plurality of light-convergent points are so placed that an interval of the light-convergent points in the Z direction becomes equal to a preset interface-to-interface distance.

According to a seventh aspect of the present invention, there is provided the interfacial position measuring method as defined in the first aspect, wherein after the emitted light is reflected or transmitted by a diffraction grating, the plurality of light-convergent points are placed within the substrate.

According to an eighth aspect of the present invention, there is provided the interfacial position measuring method as defined in the first aspect, wherein the emitted light is split into two pencils of light having optical axes parallel to each other, and thereafter applying the two pencils of light to the substrate.

According to a ninth aspect of the present invention, there is provided an interfacial position measuring method comprising:

emitting light so that a plurality of first light-convergent points are placed on a diffraction grating;

placing a plurality of second light-convergent points formed by diffracted light of the plurality of first light-convergent points diffracted by the diffraction grating onto different coordinates, respectively, in an X direction parallel to a surface of the substrate in which a plurality of optically transparent layers are laminated, and a Z direction vertical to the surface of the substrate; and then, measuring light intensities of reflected light of the light from the diffraction grating and reflected within the substrate, and determining a position having a light intensity exceeding a threshold value as an interfacial position between the layers.

According to a tenth aspect of the present invention, there is provided a layer thickness measuring method comprising:

emitting light to a substrate in which a plurality of optically transparent layers are laminated;

placing a plurality of light-convergent points formed by the said emitted light onto different coordinates, respectively, in an X direction parallel to a surface of the substrate and a Z direction vertical to the surface of the substrate;

then, measuring light intensities of reflected light of the said emitted light and reflected within the substrate, and determining a position having a light intensity exceeding a threshold value as an interfacial position between the layers; and determining an interval between adjacent interfacial positions as a layer thickness of the substrate.

According to an eleventh aspect of the present invention, there is provided the layer thickness measuring method as defined in the tenth aspect, further comprising:

measuring a relative angle between an optical axis of the said emitted light and the substrate surface, wherein the layer thickness is determined based on the relative angle, the interval between the interfacial positions and refractive indices of the individual layers.

According to a twelfth aspect of the present invention, there is provided the layer thickness measuring method as defined in the tenth aspect, further comprising:

measuring a relative angle of the optical axis and the substrate surface by using first light and second light applied to the substrate along an identical optical axis, wherein the layer thickness is determined based on the relative angle, the interval between the interfacial positions and refractive indices of the individual layers.

According to a thirteenth aspect of the present invention, there is provided an optical disc manufacturing method comprising:

with the substrate provided by an optical disc, after forming the plurality of layers on the optical disc, measuring a layer thickness of the optical disc by the layer thickness measuring method as defined in the tenth aspect; and if a measured layer thickness of the optical disc exceeds a threshold value, removing the optical disc from manufacturing process thereof.

According to a fourteenth aspect of the present invention, there is provided an optical disc manufacturing method comprising:

with the substrate provided by an optical disc, after forming the plurality of layers on the optical disc, measuring a layer thickness of the optical disc by the layer thickness measuring method as defined in the tenth aspect; and if a measured layer thickness of the optical disc exceeds a threshold value, discarding the optical disc.

According to a fifteenth aspect of the present invention, there is provided an interfacial position measuring apparatus, comprising:

a light source for emitting light to a substrate surface of a substrate having a plurality of optically transparent layers laminated therein;

a diffraction grating which is placed so as to be parallel and to be inclined with respect to an optical axis of the said emitted light, for diffracting the said emitted light so that a plurality of light-convergent points are formed by the diffracted light and placed within the substrate;

a measuring unit for measuring light intensities of reflected light and reflected within the substrate; and a control unit for comparing the light intensities and a threshold value with each other.

According to a sixteenth aspect of the present invention, there is provided an interfacial position measuring apparatus, comprising:

a light source for emitting light to a substrate having a plurality of optically transparent layers laminated therein;

a Fresnel lens which is placed between the light source and the substrate so as to be inclined with respect to the substrate surface and an optical axis of the light from the light source, for forming a plurality of light-convergent points by the light from the light source and placing the points within the substrate;

a measuring unit for measuring light intensities of reflected light and reflected within the substrate; and a control unit for comparing the light intensities and a threshold value with each other.

According to a seventeenth aspect of the present invention, there is provided an interfacial position measuring apparatus, comprising:

a light source for emitting light to a substrate having a plurality of optically transparent layers laminated therein;

a fan-shaped Fresnel lens which is placed between the light source and the substrate so as to be parallel to the substrate surface and inclined with respect to an optical axis of the light from the light source, for forming a plurality of light-convergent points by the said emitted light and placing the points within the substrate;

a measuring unit for measuring light intensities of reflected light and reflected within the substrate; and a control unit for comparing the light intensities and a threshold value with each other.

According to an eighteenth aspect of the present invention, there is provided a layer thickness measuring apparatus, comprising:

a light source for emitting light to be parallel to a substrate surface of a substrate having a plurality of optically transparent layers laminated therein;

a diffraction grating which is placed so as and to be inclined with respect to an optical axis of the said emitted light, for diffracting the said emitted light so that a plurality of light-convergent points are formed by the diffracted light and placed within the substrate;

a measuring unit for measuring light intensities of reflected light and reflected within the substrate; and layer thickness measuring means for determining, as a layer thickness, a distance between interfaces of the substrate based on a position having a light intensity exceeding a threshold value, an angle formed by the optical axis of the light from the light source and the surface of the substrate, and refractive indices of the layers.

According to a nineteenth aspect of the present invention, there is provided an optical disc manufacturing apparatus, comprising:

a holding unit for holding an optical disc;

the layer thickness measuring apparatus as defined in the eighteenth aspect for measuring the layer thickness of the optical disc as the substrate held by the holding unit; and disc determining means for determining a state of an optical disc by comparing the layer thickness measured by the layer thickness measuring apparatus and a threshold value with each other.

According to the present invention, in a substrate having a plurality of interfaces in its inside, interfacial positions of the substrate can be measured with high speed.

Also, the inclination angle is multiplied by an inclination factor to correct a measured value of an interface-to-interface distance. As a result of this, errors can be reduced, so that high-accuracy measurement can be achieved.

Also, reflected light patterns formed from interfaces and formed on a plane of a diffraction grating lattice are formed on a line sensor as enlarged images, by which light-convergent points by individual interfaces are prevented from overlapping among their respective light intensity distribution. Therefore, noise-reduced signals can be obtained, so that measurement accuracy of interface-to-interface distances can be improved.

Furthermore, incident light to and reflected light from a sample are completely separated from each other. As a result, incident light can be prevented from entering directly into the light-receiving portion and moreover light noise can be reduced, so that the measurement accuracy can be improved.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
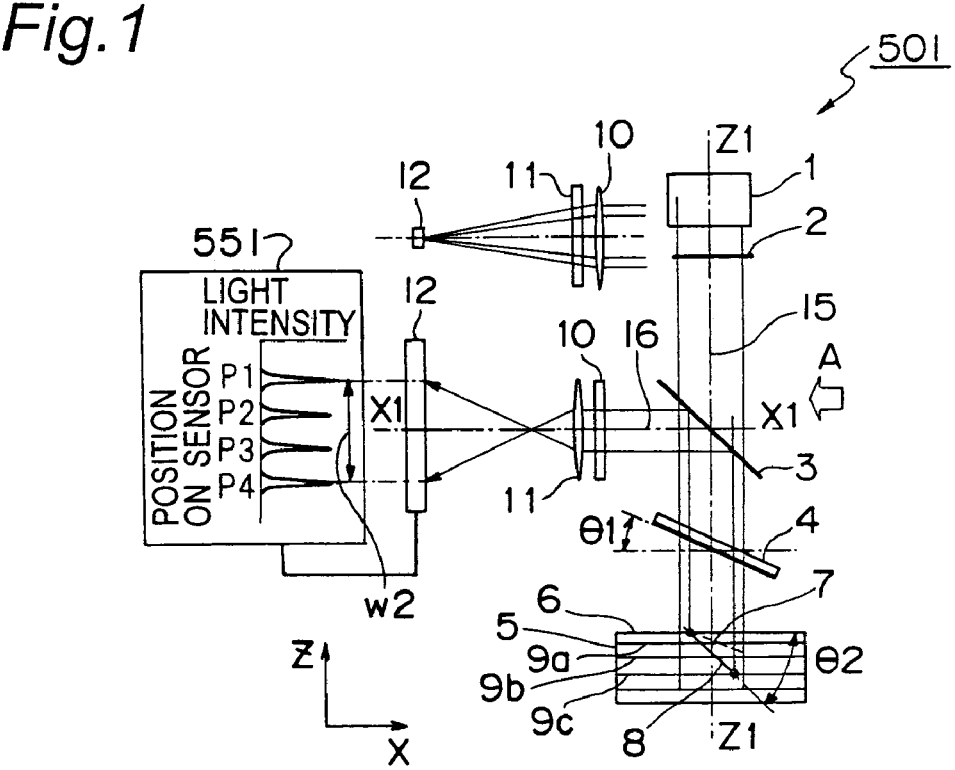
FIG. 1 is a schematic view of an interfacial position measuring apparatus according to a first embodiment of the present invention.

Before the description of the present invention proceeds, it is to be noted that like parts are designated by like reference numerals throughout the accompanying drawings.

Hereinbelow, embodiments of the present invention will be described in detail with reference to the accompanying drawings.

First Embodiment

FIG. 1 is a schematic view of an interfacial position measuring apparatus 501 according to a first embodiment of the present invention. With respect to coordinate axes, as viewed toward the drawing sheet surface, the X axis extends along a right-and-left direction, the Z axis extends along an up-and-down direction and the Y axis extends along a depth direction. Also, FIG. 2 shows a view of a Z1-Z1 cross section of FIG. 1 as viewed in the direction of arrow A (a Z sectional view of the interfacial position measuring apparatus 501 in the first embodiment.

Figure 2:
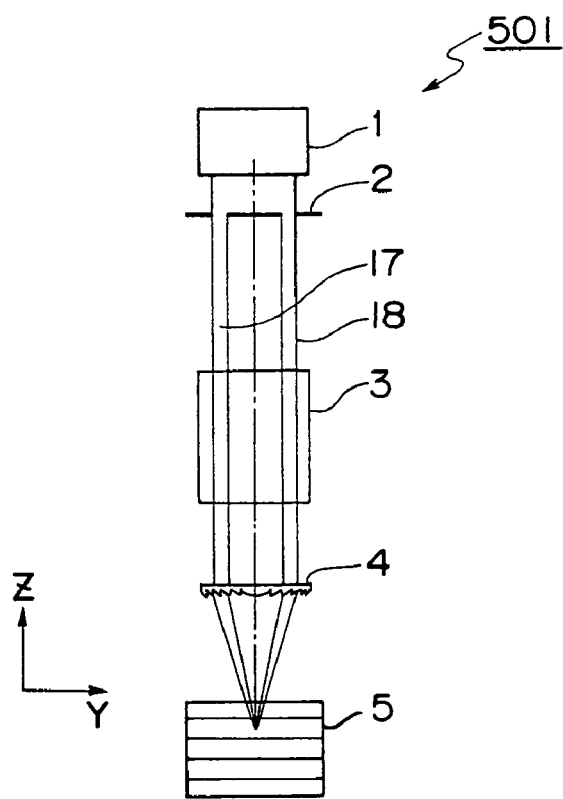
FIG. 2 is a Z sectional view of the interfacial position measuring apparatus in the first embodiment.

Referring to FIGS. 1 and 2, the interfacial position measuring apparatus 501 of the first embodiment includes a light source 1, a slit plate 2, a half mirror 3, a Fresnel cylindrical lens 4, cylindrical lenses 10, 11, a line sensor 12, and a control unit 551 for calculating an interfacial position based on a distribution of light intensities acquired by the line sensor 12. A sample 5, a sample surface 6 and reflecting interfaces 9 are defined as objects to be measured. Further, light-convergent point arrays 7, 8, optical axes 15, 16 and pencils of light 17, 18 are defined for explanation's sake. It is noted that the term, light-convergent point array, herein refers to an array of a plurality of light-convergent points arrayed linearly into one row. Accordingly, the light-convergent point array includes both cases where a plurality of light-convergent points are arrayed into one dot line, and where a multiplicity of light-convergent points are arrayed closely into one row so that a pseudo line is formed by the light-convergent points.

The light source 1 emits parallel light of uniform intensity distribution. The parallel light is obtained by scaling up or down emission light of a laser to a specified size by a beam expander, or by parallelizing emission light of a semiconductor laser. The light source 1 used in the first embodiment has a laser wavelength of 405 nm. In the first embodiment, those having a laser wavelength of 350 to 1500 nm are usable as the light source 1. The light source 1 also has such a laser diameter as to irradiate the later-described opening portion of the slit plate 2 uniformly all over. It is also assumed that an axis which is parallel to the emission light from the light source 1 and which passes through a center of the light source is taken as the optical axis 15. The optical axis 15 is placed along the Z-axis direction.

The slit plate 2 having slit-like openings is placed vertical to the optical axis 15 and has two openings 14 placed symmetrical about the Y axis. The slit plate 2 is so placed that its center coincides with the optical axis 15. The slit plate 2 is exemplified by one in which light shielding portions are formed on a glass plate by evaporation, or another in which holes are formed in a thin light-shield plate.

A center of the half mirror 3 passes through the optical axis 15. Also, the half mirror 3, having a semi-transparent reflecting surface whose normal line is within a drawing sheet (within the X-Z plane), is so placed as to form an angle of generally 45 degrees to the optical axis 15. A semi-transparent reflecting film is formed so that reflectivity and transmissivity become generally equal to each other at the half mirror 3. Also, for prevention of occurrence of ghosts at the half mirror 3, the half mirror 3 has an anti-reflection film formed on its surface on which no semi-transparent reflecting film is formed.

The Fresnel cylindrical lens 4 is a cylindrical lens of the Fresnel type. The Fresnel type lens is a lens in which a small prism having a refracting effect is formed on a substrate and this has generally constant lens thickness in its front surface. The Fresnel cylindrical lens 4 has a uniform cross-sectional configuration in the X-axis direction. The Fresnel cylindrical lens 4 is a lens having a focal length f and placed with its cylindrical axis inclined at an angle of θ1 with respect to an axis (X axis) vertical to the optical axis 15. For a clear expression of angles, it is assumed here that the angle increases positively counterclockwise, and that 0<θ1<90°.

The sample 5 is a transparent substrate having a refractive index 'n' and formed by laminating a plurality of optically transparent layers that allow light to pass therethrough, the transparent substrate having a plurality of interfaces 9a, 9b, 9c, ... formed therein. The interfaces, which are, for example, thin transparent films or metal films different in refractive index from the sample 5, or reflecting film formed by laminating those films, have a property of reflecting part of incident light and transmits the rest of the light. The interfaces 9 (9a, 9b, 9c, ...) are formed generally parallel to the sample surface 6, and the sample 5 is so placed that the normal line of the sample surface 6 becomes parallel to the optical axis 15. It is noted that the interfaces 9 (9a, 9b, 9c, ...) are not limited to those which are formed into thin transparent films or reflecting films, but may be those in which an interface is given by a boundary surface of two layers having mutually different optical characteristics.

The cylindrical lens 10 is so placed that its cylindrical axis becomes parallel to the Z-axis direction (vertical direction in the drawing sheet), the center of the cylindrical lens 10 being placed on the optical axis 16. The optical axis 16 is an axis of light which is reflected by the sample 5 and turned back generally perpendicularly by the half mirror 3.

The cylindrical lens 11 is so placed that its cylindrical axis becomes parallel to the Y-axis direction (depth direction in the drawing sheet), the center of the cylindrical lens 11 being placed on the optical axis 16.

The line sensor 12 has a plurality of light-receiving pixels on its light-receiving surface, the light-receiving pixels being arrayed parallel to the Z-axis direction. A pixel width in the Y-axis direction is small enough relative to the diameter of light-convergent points by the cylindrical lens 10. The line sensor 12 is so placed that an optical path length between the light-receiving surface of the line sensor 12 and the principal plane of the cylindrical lens 10 equals the emission-side focal length of the cylindrical lens 10. Also, the cylindrical lens 11 is so placed that an image of a neighborhood of the focal position of the Fresnel cylindrical lens 4 is formed on the light-receiving surface of the line sensor 12.

Figure 3:
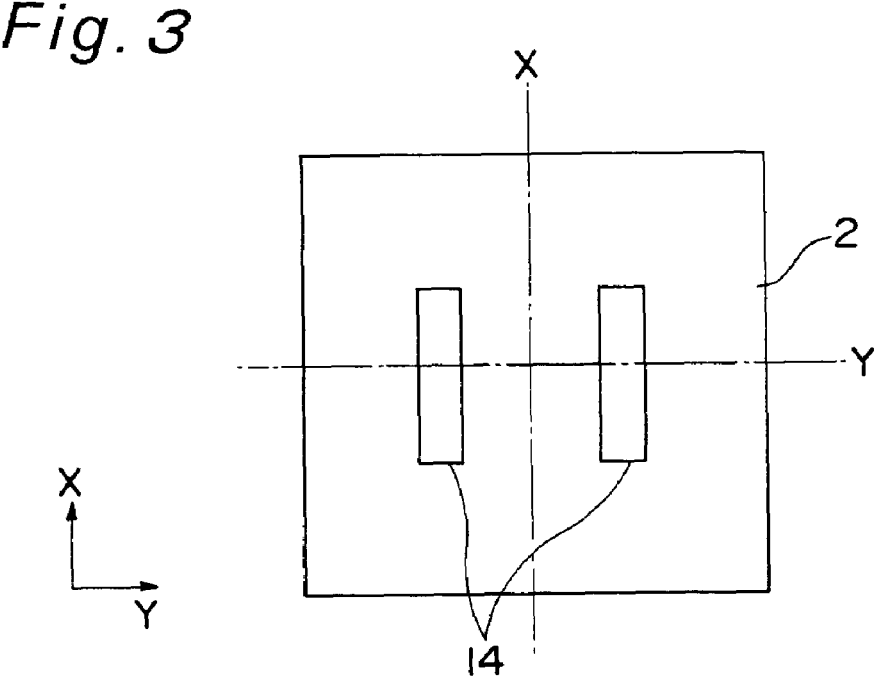
FIG. 3 is a configurational view of a slit plate in the first embodiment.
Figure 4:
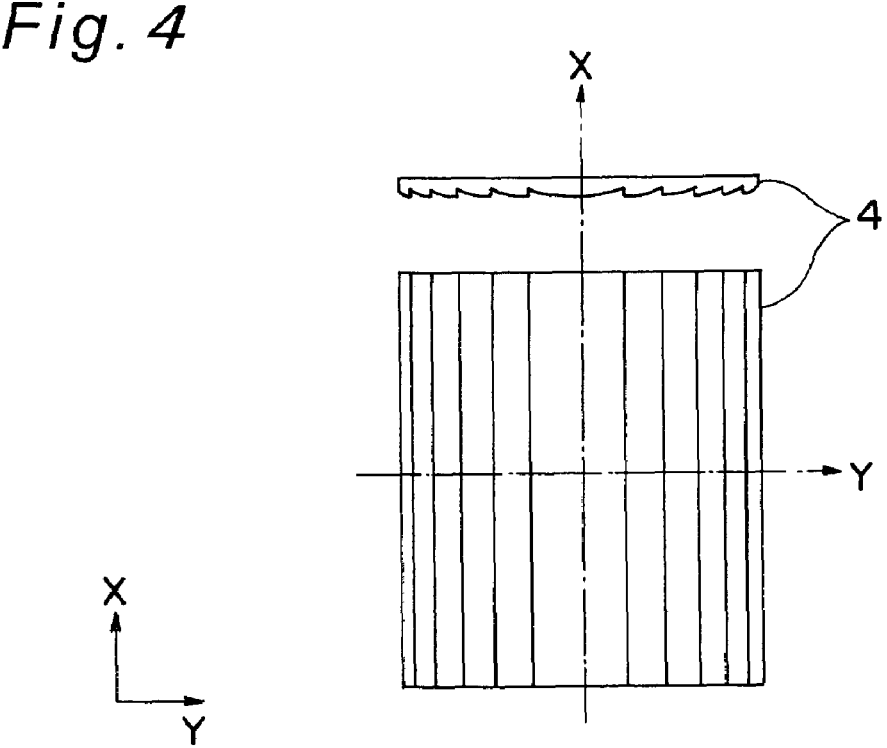
FIG. 4 is a configurational view of a Fresnel cylindrical lens in the first embodiment.

A configurational view of the slit plate 2 in the first embodiment is shown in FIG. 3, and a configurational view of the Fresnel cylindrical lens 4 in the first embodiment is shown in FIG. 4. It is noted that a lower face view of the Fresnel cylindrical lens 4 is shown on the lower side and a side view thereof is shown on the upper side in FIG. 4.

Interfacial position measurement operation in the interfacial position measuring apparatus 501 of the first embodiment constructed as described above is now explained.

Emission light emitted from the light source 1 is partly intercepted by the slit plate 2, forming two pencils of light 17, 18 symmetrical about the optical axis 15. The pencils of light 17, 18 are transmitted by the half mirror 3, going incident on the Fresnel cylindrical lens 4 that functions to condense light on a straight line. In FIG. 1, the Fresnel cylindrical lens 4 is inclined by an angle θ1 with respect to the X axis, which is an axis parallel to the sample 5 surface. The light-convergent point array 8 formed inside the sample 5 by the Fresnel cylindrical lens 4 is inclined by an angle θ2 with respect to the X axis. Therefore, the light-convergent point array 8 intersects the interfaces 9 (9a, 9b, 9c, . . . ) inside the sample 5. Light incident on the sample 5 is reflected by the reflecting interfaces 9, which are interfaces inside the sample 5, and the light passes again through the Fresnel cylindrical lens 4 and reflected by the half mirror 3, thus being formed into an image on the line sensor 12 by the cylindrical lenses 10, 11.

Now a method for measuring thicknesses of layers inside the sample 5 is explained concretely with reference to FIG. 1. In the control unit 551 of FIG. 1, if a light intensity peak exists at a sensor position P4 on the line sensor 12, it is decided that light reflected by the sample surface 6 is being measured. One method for determining the sample surface 6 in the control unit 551 is that the light-convergent point array 8 is gradually applied to the sample 5 first from a position far from the sample 5, and the light intensity peak that appears for the first time is taken as the sample surface 6. Another method for determining the sample surface 6 is that a light-convergent point array 8 enough longer than the thickness of the sample 5 is formed and applied so as to intersect individual layers inside the sample 5, where the light intensity peak that first appears for the first time on the line sensor 12 is taken as the sample surface 6. In this case, the light intensity peak has only to exceed a certain threshold value, and the way how it is manifested varies depending on the material of the sample, the properties of light and the like.

In succession to the sample surface 6, in the control unit 551, light reflected by the interface 9a can be measured from a light intensity peak at a sensor position P3 on the line sensor 12. Similarly, light reflected by the interface 9b can be measured from a light intensity peak at a sensor position P2 on the line sensor 12, and light reflected by the interface 9c can be measured from a light intensity peak at a sensor position Pi on the line sensor 12.

From light intensity peak positions detected by the line sensor 12, positions of the sample surface 6 and the interfaces 9 (9a, 9b, 9c, . . . ) of the sample 5 can be measured. In this case, moreover, thicknesses of layers inside the sample 5 can also be measured by using a trigonometric function from the angle θ2 of the light-convergent point array 8 and the light intensity peak positions of the sample surface 6 and the interfaces 9. More specifically, the thickness of a layer inside the sample 5 can be measured by multiplying a distance between light intensity peaks by tan θ2.

Now the measurement operation by the interfacial position measuring apparatus 501 is explained in more detail.

Emission light having a wavelength of 405 nm emitted from the light source 1 is formed into two pencils of light 17, 18 symmetrical about the optical axis 15 by the slit plate 2. The pencils of light 17, 18 are transmitted by the half mirror 3, going incident on the Fresnel cylindrical lens 4. As the Fresnel cylindrical lens 4 is inclined by the angle θ1 with respect to the X axis in FIG. 1, so the light-convergent point array 7, which is formed in air by the Fresnel cylindrical lens 4, is also inclined by the angle θ1. Generally, when parallel light is applied so as to be incident on an inclined spherical cylindrical lens, the focal position varies depending on the incident position on the lens because of thickness differences between central portion and peripheral portion of the lens. However, in the Fresnel cylindrical lens, in which its lens thickness is generally constant over the whole region, inclination of the lens causes no difference in optical path between central portion and peripheral portion of the lens. Therefore, light-convergent points free from distortions can be formed. In this first embodiment, emission light of the inclined Fresnel cylindrical lens 4 converges within the sample 5, forming the light-convergent point array 8.

Figure 5:
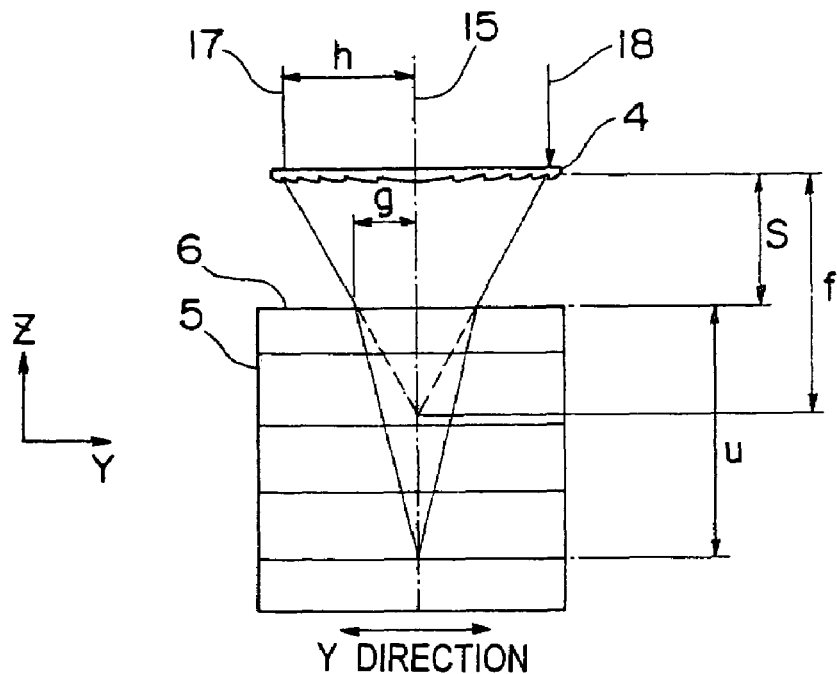
FIG. 5 is an optical path view by a Y-Z plane in the first embodiment.

Now, an optical path view of a Y-Z plane in the first embodiment is shown in FIG. 5.

Referring to FIG. 5, an incident angle at which a light pencil has been incident at a position distant by 'h' from the optical axis 15 of the Fresnel cylindrical lens 4 in the Y-axis direction becomes incident on the sample 5 is assumed as φ1. In this case, with the focal length f of the Fresnel cylindrical lens 4, φ1 satisfies conditions of (Equation 1):

$$\tan(\phi 1) = h/f \qquad \text{(Equation 1)}$$

Assuming that an angle at which the light pencil is refracted by the sample surface 6 is φ2, (Equation 2) holds with a refractive index n of the sample 5 from Snell's law, where it is assumed in this first embodiment that refractive indices of layers provided in a plurality are of the same, being n for all:

$$\sin(\phi 1) = n \times \sin(\phi 2) \qquad \text{(Equation 2)}$$

Given a distance 'S' from the principal plane of the Fresnel cylindrical lens 4 to the sample surface 6, a distance 'u' from the sample surface 6 to a light-convergent point, and a radius 'g' of laser that has been incident on the sample surface 6, the following equations, (Equation 3) and (Equation 4), result. By using the equations (Equation 1) to (Equation 4), the distance 'u' from the sample surface 6 to the light-convergent point is determined as (Equation 5):

$$g = u \times \tan(\varphi 2) \qquad \text{(Equation 3)}$$

$$g = (f - S)\tan(\varphi 1) \qquad \text{(Equation 4)}$$

$$u = \frac{h}{f}(f - S)\sqrt{n^2 - 1 + \left(\frac{fn}{h}\right)^2} \qquad \text{(Equation 5)}$$

From (Equation 5), it is conclude that the focal position represented by 'u' depends on the incident position 'h' on the Fresnel cylindrical lens 4. Generally, as the focal length is shortened by enlarging the aperture of the lens, the focal depth becomes smaller, so that measurement accuracy in the Z-axis direction (depth direction) can be improved. However, if light-convergent point positions are varied in the Z-axis direction by the incident position on the Fresnel cylindrical lens 4, the light-convergent points would be diffused, so that the measurement accuracy would deteriorate, conversely. Therefore, by restricting widths of the pencils of light 17, 18 in the Y-axis direction with the slit plate 2, the incident angle on the sample 5 can be made generally constant, so that the diffusion of the light-convergent points can be prevented and deterioration of the measurement accuracy can be prevented.

Now, modifying (Equation 5) by using v(v=(f−S)) as a light-convergent point position in the air by referencing the sample surface 6, results in (Equation 6):

$$\frac{u}{v} = \frac{h}{f}\sqrt{n^2 - 1 + \left(\frac{fn}{h}\right)^2} \quad \text{(Equation 6)}$$

Since the incident position 'h' on the Fresnel cylindrical lens 4, the focal length 'f' and the refractive index 'n' are all constant, the right side of (Equation 6) becomes a constant, where 'v' represents the light-convergent point array 7 in the air and 'u' represents the light-convergent point array 8 in the sample, these having a proportional relationship to each other. As the light-convergent point array 7 is formed on a line, so the light-convergent point array 8 is also formed on a line likewise. In this case, the inclination angle θ2 of the light-convergent point array 8 with respect to the X axis can be expressed as shown by (Equation 7) by using the right side of (Equation 6):

$$\frac{\tan(\theta 2)}{\tan(\theta 1)} = \frac{h}{f}\sqrt{n^2 - 1 + \left(\frac{fn}{h}\right)^2} \quad \text{(Equation 7)}$$

As shown above, the light-convergent point array 8 having the angle θ2 to the X axis can be formed inside the sample 5 by the Fresnel cylindrical lens 4.

In the first embodiment, the angle θ1 is 45°, and the refractive index of the sample 5 is 1.5.

The light that has been incident on the sample 5 is reflected by the interfaces 9, which are boundary surfaces of the layers inside the sample 5, and passes again through the Fresnel cylindrical lens 4 so as to be reflected by the half mirror 3 and formed into an image on the line sensor 12 by the cylindrical lens 10 and the cylindrical lens 11. The Fresnel cylindrical lens 4, the cylindrical lens 10 and the line sensor 12 are in a confocal positional relationship. That is, since light-receiving pixels of the line sensor 12 are placed at an emission-side focal position of the cylindrical lens 10, an occurrence that the interfaces 9 are positioned at the emission-side light-convergent point positions of the Fresnel cylindrical lens 4 causes light-convergent points to occur on the light-receiving pixels of the line sensor 12. Also, in the X-Z plane, the light-convergent point array 8 inside the sample 5 is formed into an image on the line sensor 12 by the cylindrical lens 11. Therefore, in combination with the Y-Z plane, light-convergent points occur at positions in the Z-axis direction on the line sensor 12 corresponding to positions at which the light-convergent point array 8 and the interfaces 9 inside the sample 5 intersect. Thus, from the light intensity peak positions detected by the line sensor 12, positions of the sample surface 6 and the interfaces 9 of the sample 5 can be measured.

In addition, with a placement that the light-convergent point array 8 completely intersects the sample 5, top and bottom surfaces of the sample 5 in the Z-axis direction can be measured accurately. That is, by providing such a placement that at least one light-convergent point is present outside each of the top and bottom surfaces of the sample 5 in the Z-axis direction, the top and bottom surfaces of the sample 5 can be measured accurately.

Also, by equalizing intervals between the light-convergent points in the light-convergent point array 8, BD or other optical disc in which a plurality of uniform layers are formed can be measured at high speed.

Figure 6:
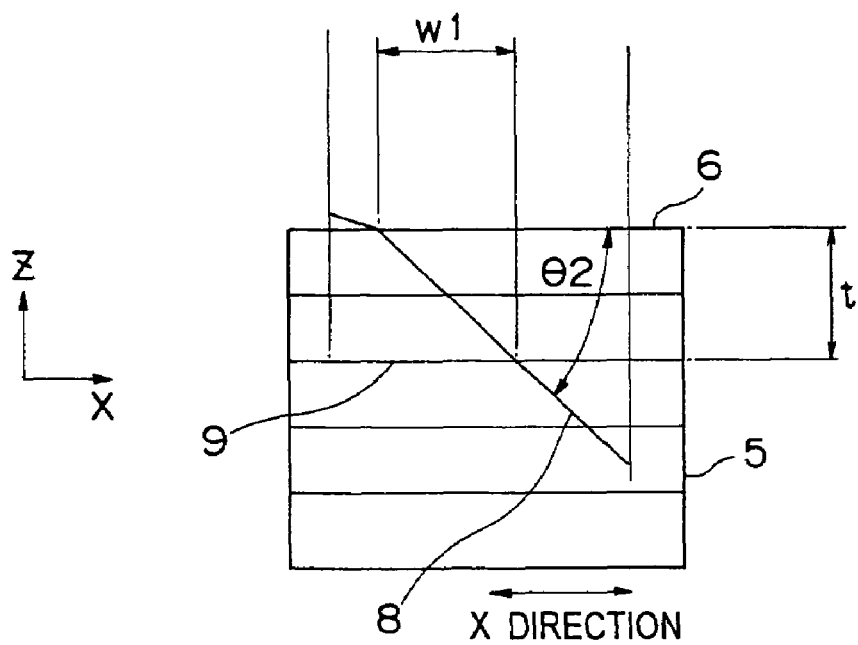
FIG. 6 is an in-sample optical path view by an X-Z plane in the first embodiment.

FIG. 6 shows an in-sample optical path view by the X-Z plane in the first embodiment.

Referring to FIG. 6, given that an intersection point between the sample surface 6 and the light-convergent point array 8 is taken as a reference and that a distance to the interface 9 in the X-axis direction is w1, then the film thickness, i.e. a distance t from the sample surface 6 to the interface 9 is as expressed in (Equation 8):

$$t = w1 \times \tan(\theta 2) \quad \text{(Equation 8)}$$

If an image-taking power on the line sensor 12 by the cylindrical lens 11 within the X-Z plane is 'a', then a measured value on the line sensor 12, i.e., the film thickness t can be given by the following (Equation 9) from a distance w2 (w2=w1×a) between a light intensity peak position corresponding to the sample surface 6 and another light intensity peak position corresponding to the reflecting interface 9:

$$t = (w2/a) \times \tan(\theta 2) \quad \text{(Equation 9)}$$

In the first embodiment, the image-taking power on the line sensor 12 by the cylindrical lens 11 is set to a magnification of 30-50.

Further, given a measurement range wz in the Z direction and a resolution wx in the X direction, then the width of the laser applied to the sample within the X-Z plane, i.e., the width of the slit in the X direction needs to be at least wx or less. Therefore, the inclination angle θ2 of the light-convergent point array within the sample 5 with respect to the X axis may properly be set as tan(θ2)>wz/wx. Thus, from (Equation 7), θ1 has only to satisfy the following (Equation 10):

$$\tan(\theta 1) > \frac{f \times wz}{wx \times h\sqrt{n^2 - 1 + \left(\frac{fn}{h}\right)^2}} \quad \text{(Equation 10)}$$

The number of interfaces 9 inside the sample 5 is set to one in the above description. However, since light intensity peaks in one-to-one correspondence to intersection points between the interfaces 9 and the light-convergent point array 8 occur on the line sensor 12, distances between the interfaces or distances from the sample surface 6 to the individual interfaces can be measured regardless of the number of interfaces inside the sample 5.

As described above, in the first embodiment, a light-convergent point array inclined with respect to the sample surface is formed by using a Fresnel cylindrical lens, and light intensity peaks occurring at intersection points between the light-convergent point array and sample reflecting interfaces are detected. Thus, the sample surface and a plurality of interfacial positions inside the sample can be measured simultaneously, so that high-speed measurement can be achieved. Also, since incident light on the Fresnel cylindrical lens is formed into two pencils of light, the incident angle on the sample can be made constant, so that differences in focal position due to the spherical aberration can be prevented and deteriorations of the measurement accuracy in the depth direction (thickness direction of the substrate) can be prevented. Further, by using monochromatic light as the light source, high-accuracy measurement can be achieved without being affected by light transmittance of the interfaces or wavelength dependence of the optical reflectance.

As described above, layer thicknesses can be determined by using individual interfacial positions determined through measurement of sample interfaces as well as by using the refractive indices of the individual layers.

In a case where layer thicknesses of a substrate having four layers inside are all measured, it would be necessary with a prior-art method to perform the measurement for each one layer each with time required one after another. However, according to the present invention, the measurement can be carried out without moving the substrate and moreover done with the four layers collectively. Therefore, in terms of measurement time, the measurement can be achieved as fast as in several tenths or less the time required by the conventional method.

With the method described above, for example, thicknesses of layers formed in BD, DVD or other optical discs can be determined at high speed. In optical discs, generally, the layers are so formed that their thicknesses fall within a certain reference value. Therefore, by the present invention, layer thicknesses of optical discs are classified into those exceeding the reference value and those not by a specified threshold value, by which optical discs whose layer thicknesses exceed the reference value can be detected. Optical discs whose layer thicknesses exceeding the reference value, detected as shown above, are removed from the manufacturing line and discarded in manufacturing process of optical discs. Thus, the present invention can be applied even to mass production methods for manufacturing optical discs of less variations and high accuracy.

An example in which optical discs exceeding a reference value are discarded has been described above. However, if one layer, after once formed, may be removed without causing influences on its surroundings, only layers exceeding the reference value are removed and those layers may be formed again so that the yield of optical discs can be improved.

Second Embodiment

Figure 7:
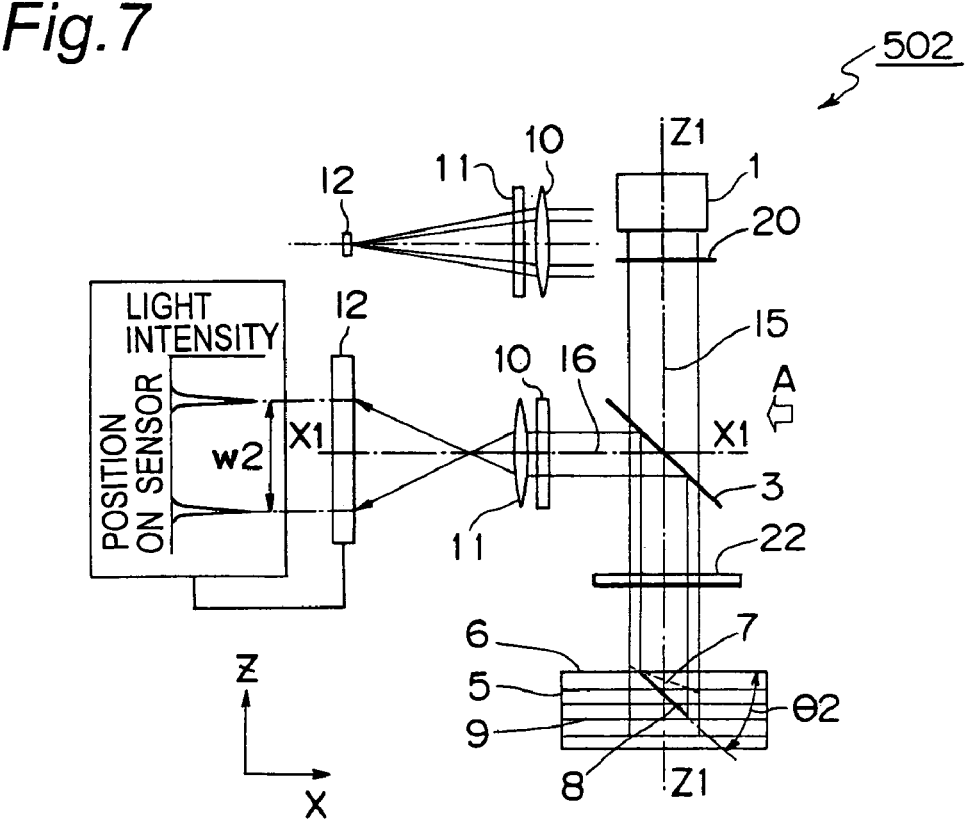
FIG. 7 is a schematic view of an interfacial position measuring apparatus according to a second embodiment of the invention.
Figure 8:
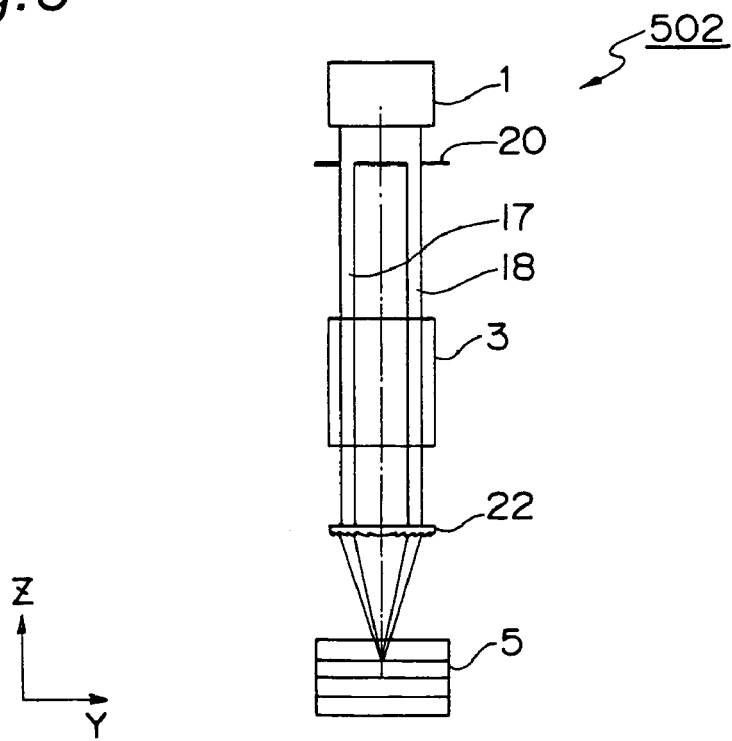
FIG. 8 is a Z sectional view of the interfacial position measuring apparatus in the second embodiment.
Figure 9:
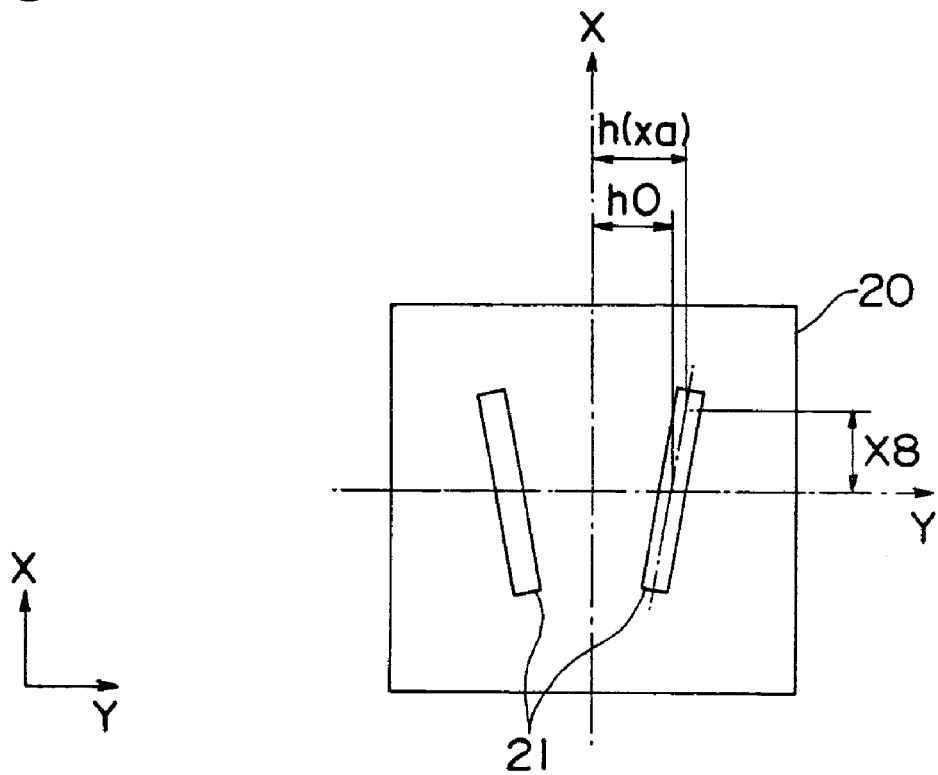
FIG. 9 is a configurational view of a slit plate in the second embodiment.
Figure 10:
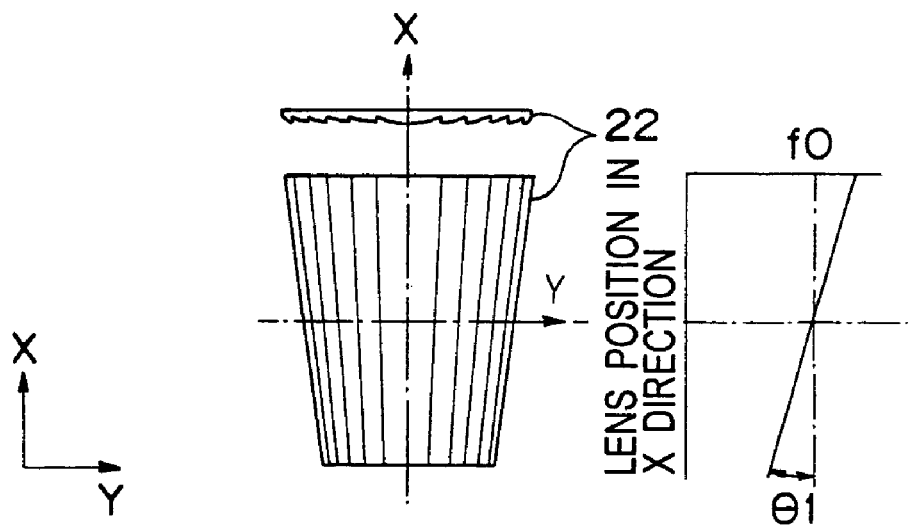
FIG. 10 is a configurational view of a Fresnel fan-shaped cylindrical lens in the second embodiment.

The present invention is not limited to the constitution of the foregoing first embodiment, and may be emitted in other various modes. For example, FIG. 7 shows a schematic view of an interfacial position measuring apparatus 502 according to a second embodiment. FIG. 8 shows a view of a Z1-Z1 cross section of FIG. 7, as viewed along a direction of the arrow A (a Z sectional view of the interfacial position measuring apparatus 502 in this second embodiment), FIG. 9 shows a configurational view of a slit plate in the second embodiment, and FIG. 10 shows a configurational view of a Fresnel cylindrical lens in the second embodiment. In FIG. 10, a side view of the Fresnel cylindrical lens, and a graph showing a relationship between position in the X-axis direction and focal length of the lens, are shown in association with a plan view of the Fresnel cylindrical lens.

Referring to FIGS. 7 and 9, a slit plate 20 is vertical to the optical axis 15 and has two openings 21 symmetrical about the X-axis direction. Each of the openings 21 is so formed with a relative inclination to each other that one half of the distance between those openings on the Y axis, i.e. at the origin point of the X axis (optical axis 15), is h0, and that one half of the distance between those openings at a place distant by xa from the origin point of the X axis (optical axis 15) in the X-axis direction is h(xa).

As shown in FIG. 10, a Fresnel fan-shaped cylindrical lens 22 is formed of small prisms having a refracting effect with its cylindrical axis placed along the X-axis direction, where its focal length is f0 at the origin point of the X axis (optical axis 15) and a focal length f(xa) at a distance xa toward the X-axis direction is represented by $f(xa)=f0+xa\times\tan(\theta 1)$.

In this case, h(xa) is so selected that the value of $h(xa)/f(xa)=h(xa)/(f0+xa\times\tan(\theta 1))$ becomes a constant k within the slit width, independently of the distance xa.

With regard to the interfacial position measuring apparatus 502 constructed as shown above, its measuring operation is explained below.

Emission light from the light source 1 is formed by the slit plate 20 into two pencils of light 17, 18 symmetrical about the optical axis 15. The pencils of light 17, 18 are transmitted by the half mirror 3, going incident on the Fresnel fan-shaped cylindrical lens 22. Since the focal position of the Fresnel fan-shaped cylindrical lens 22 is inclined by an angle $\theta 1$ with respect to the X axis, the resulting light-convergent point array 7 is inclined by an angle $\theta 1$ with respect to the X axis as in the first embodiment. The Fresnel fan-shaped cylindrical lens 22 has its lens surface placed vertical to the optical axis 15, and so distortion-free light-convergent points can be formed. Emission light of the Fresnel fan-shaped cylindrical lens 22 converges within the sample 5, resulting in a light-convergent point array 8. An incident angle $\phi 1$ on the sample 5 at the position xa in the X-axis direction becomes $\tan^{-1}(h(xa)/f(xa))$, and an opening position h(xa) is formed so that the value of $h(xa)/f(xa)=k$ becomes a constant. Therefore, the incident angle $\phi 1$ also becomes a constant value. Also, in (Equation 5), since S is a constant value S0 and f takes a value of $f(xa)=f0+xa\times\tan(\theta 1)$, a distance 'u' from the sample surface 6 to the light-convergent point is as shown by (Equation 11):

$$u = k(xa \times \tan(\theta 1) + f0 - S0)\sqrt{n^2 - 1 + \left(\frac{n}{k}\right)^2} \quad \text{(Equation 11)}$$

From (Equation 11), 'u' is expressed by a linear equation with respect to the position xa in the X-axis direction, so that a linear light-convergent point array 8 is formed inside the sample 5 as in the first embodiment. Also, by restricting the width of the pencils of light 17, 18 in the Y-axis direction with the slit plate 20, the incident angle on the sample 5 can be made generally constant. As a result, diffusion of the light-convergent points can be prevented and deterioration of measurement accuracy can be prevented.

As in the first embodiment, positions of the interfaces 9 inside the sample 5 can be detected based on the light-convergent point array 8 formed within the sample 5.

As shown above, in this second embodiment, since positions of the sample surface 6 and a plurality of interfaces 9 can be measured simultaneously as in the first embodiment, high-speed measurement becomes achievable. Further, in the second embodiment, since the lens can be placed vertical to the optical axis with the use of the Fresnel fan-shaped cylindrical lens, aberrations due to the lens thickness resulting from inclination of the lens can be prevented. Thus, the light-convergent point arrays inside the sample and the light intensity peaks on the line sensor can be prevented from being diffused, so that high-accuracy measurement can be achieved.

Third Embodiment

Figure 11:
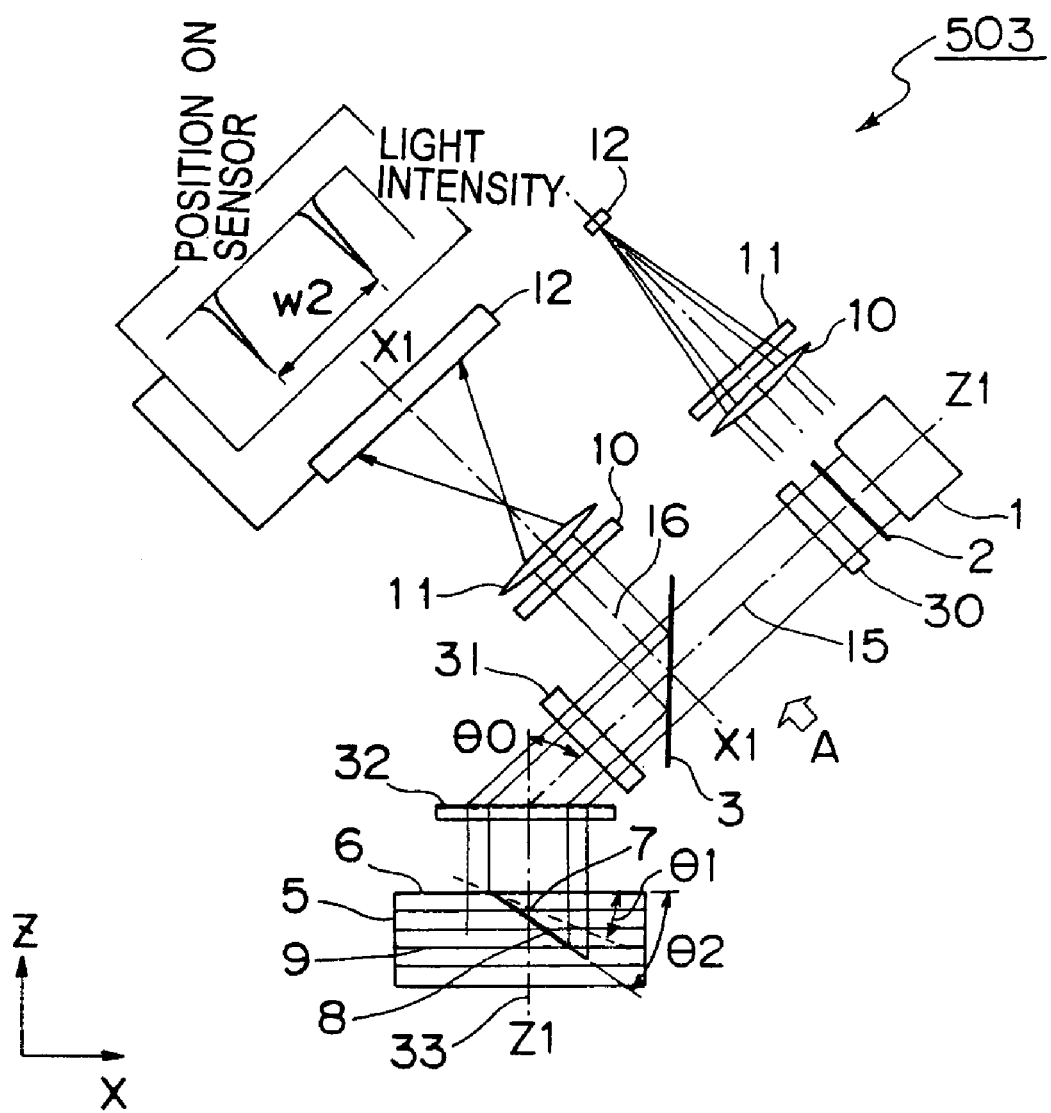
FIG. 11 is a schematic view of an interfacial position measuring apparatus according to a third embodiment of the invention.
Figure 12:
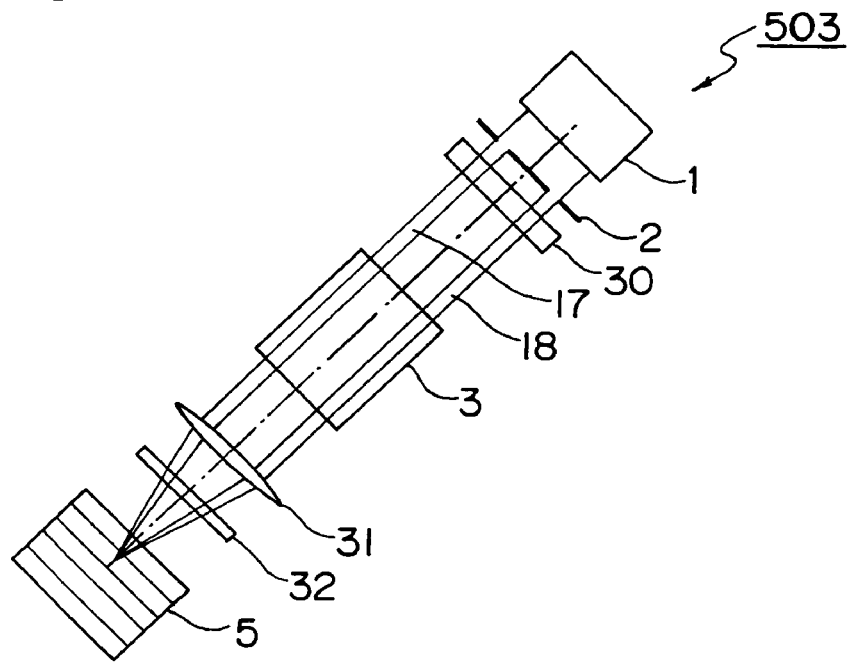
FIG. 12 is a Z sectional view of the interfacial position measuring apparatus in the third embodiment.

Next, FIG. 11 shows a schematic view of an interfacial position measuring apparatus 503 according to a third embodiment. Also, FIG. 12 shows a view of a Z1-Z1 cross section of FIG. 11, as viewed along a direction of the arrow A (a Z sectional view of the interfacial position measuring apparatus 503 in this third embodiment).

A spherical aberration correction element 30 adds to pencils of light a spherical aberration inverse to a spherical aberration which is caused by a later-described transmission type diffraction grating 32 in the Z1-Z1 cross-sectional direction.

A cylindrical lens 31 is so placed that its cylindrical axis perpendicular to the optical axis 15, and that its lens center is located on the optical axis 15.

The transmission type diffraction grating 32, which has a pitch 'p' of its lattice trenches, the trenches being directed along the Y-axis direction (depth direction in the drawing sheet of FIG. 11), is so placed between the cylindrical lens 31 and the focal plane of the cylindrical lens that the lattice formation plane is angled by an angle $\theta 0$ to the optical axis 15 in the X-Z plane. Given a wavelength $\lambda$ of the light source 1, the angle $\theta 0$ is expressed by $\sin\theta 0 = p/\lambda$. Also, with a blades type diffraction grating used as the transmission type diffraction grating 32, the resulting diffracted light is only the first-order diffracted light in most part, which is diffracted principally toward a direction shown in FIG. 11.

An optical axis 33, which results after the optical axis 15 is diffracted by the transmission type diffraction grating 32, forms an angle $\theta 0$ to the optical axis 15 in the X-Z plane.

With the sample surface 6 set parallel to the X axis, such a positioning is provided that the optical axis 15 forms an angle $\theta 0$ to the Z axis while the optical axis 33 becomes parallel to the Z axis.

With regard to the interfacial position measuring apparatus 503 constructed as shown above, its measuring operation is explained below.

Emission light from the light source 1 is formed by the slit plate 2 into two pencils of light 17, 18 symmetrical about the optical axis 15. The pencils of light 17, 18 are transmitted by the half mirror 3, going incident on the cylindrical lens 31. By the cylindrical lens 31, pencils of light within the X-Z plane are not condensed but pencils of light within the Z1-Z1 cross section are condensed. The emission light from the cylindrical lens 31 becomes incident on the transmission type diffraction grating 32 at an angle $\theta 0$ to the normal line of its lattice formation plane. With the counterclockwise direction taken as the positive direction, given the incident angle $\theta$in, an emission angle $\theta$out, lattice pitch 'p', a light pencil wavelength $\lambda$ and a diffraction order 'm', then the grating equation is that $\sin(\theta in)+\sin(\theta out)=\pm m\times\lambda/p$. Now given an emission angle $\theta$out=0° and a diffraction order m=1, then it holds that $\sin(\theta in)=\lambda/p$. Setting an incident angle so that $\sin(\theta 0)=\lambda/p$ causes the diffraction grating emission light to be directed vertical to the lattice formation plane. Since the sample surface 6 is parallel to the lattice formation plane, the incidence of light becomes vertical to the sample surface 6.

In this third embodiment, since the pitch of the transmission type diffraction grating 32 is p=1/2400 mm and the wavelength of the light from the light source 1 is $\lambda$=405 nm, an angle $\theta 0$=76.4° can be determined from the above relation.

In this case, in the Z1-Z1 cross section, convergent light by the cylindrical lens 31, which passes through the transmission type diffraction grating 32 having a thickness, is subject to occurrence of a spherical aberration due to the plate thickness. However, there occurs no spherical aberration due to the transmission type diffraction grating 32 because an aberration inverse to the spherical aberration caused by the transmission type diffraction grating 32 is preliminarily given by the spherical aberration correction element 30. In this third embodiment, a glass plate having a thickness equivalent to that of the transmission type diffraction grating 32 is used as the spherical aberration correction element 30.

Figure 13:
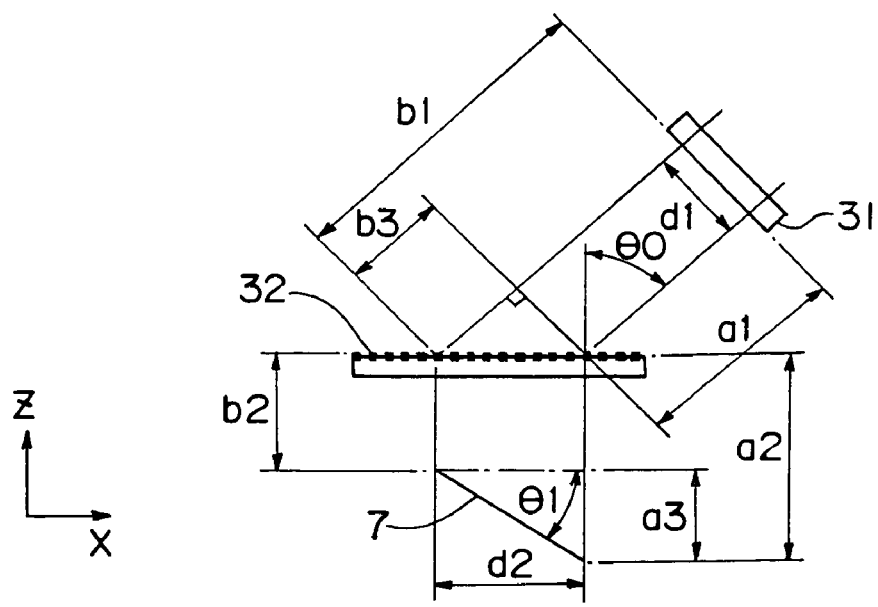
FIG. 13 is an explanatory view of a light-convergent point array inclination angle in the third embodiment.

FIG. 13 shows an explanatory view of a light-convergent point array inclination angle in the third embodiment.

In FIG. 13, an inclination angle $\theta 1$ of the light-convergent point array 7, which is formed from the cylindrical lens 31, formed to the sample surface 6 by the transmission type diffraction grating 32 is determined.

The light-convergent point array 7 is formed on a focal position of the cylindrical lens 31. Given a focal length f of the cylindrical lens 31, the optical path length within the X-Z plane is also f. This is the case also when the diffraction grating is placed between the cylindrical lens 31 and the light-convergent points. From FIG. 13, it holds that a1+a2=b1+b2=f, where the optical path lengths are b1=a1+b3 and a2=b2+a3, respectively. Accordingly, the result is that a3=b3. Given an emission laser width d1 of the cylindrical lens 31 and an emission laser width d2 of the transmission type diffraction grating 32 in the X-Z plane, the inclination angle $\theta 1$ with respect to the X axis is expressed as $\tan(\theta 1)=a3/d2$. Also, since $\sin(\theta 0)=b3/d2$, the incident angle is finally expressed as $\tan(\theta 1)=\sin(\theta 0)=\lambda/p$.

The light-convergent point array 7 formed by the cylindrical lens 31 and the transmission type diffraction grating 32, having the inclination angle $\theta 1$ to the X axis in the air, results in a light-convergent point array 8 having the inclination angle $\theta 2$ in the sample 5, as in the first embodiment.

Then, as in the first embodiment, the light-convergent point array 8 is reflected by the interfaces 9 of the sample 5, passing again through the transmission type diffraction grating 32 and the cylindrical lens 31 and being formed into an image on the line sensor 12 by the cylindrical lenses 10, 11. From light intensity peak positions on the line sensor 12 by the resulting image, positions of the interfaces 9 inside the sample 5 can be measured.

Further, given a measurement range wz in the Z direction and a resolution wx in the X direction, then the width of the laser applied to the sample within the X-Z plane needs to be at least wx or less. Since the laser width in the X-Z plane is $d2/d1=1/\cos(\theta 0)$ as a result of the diffraction by the transmission type diffraction grating 32, the X-axis direction width in the slit plate 2 may appropriately be set to $wx\times\cos(\theta 0)$ or less.

As shown above, in this third embodiment, since the sample surface and a plurality of interfacial positions inside the sample can be measured simultaneously as in the first embodiment, high-speed measurement becomes achievable. Further, as in the second embodiment, since the cylindrical lens can be placed vertical to the pencils of light, there occurs no aberration due to the inclination of the lens.

Furthermore, in this third embodiment, the light-convergent point array formed by the cylindrical lens is skewed to the sample by the transmission type diffraction grating, so that the optical path length from the cylindrical lens to the light-convergent point array becomes constant in the X-Z plane. That is, the light-convergent point array becomes vertical to the pencils of light, as viewed from the cylindrical lens. Therefore, in image formation onto the line sensor, an object plane (light-convergent point array) and an image formation plane (light-receiving surface of the line sensor 12) become parallel to each other, so that an image capture of distortion-free light intensity peaks can be achieved even with the image-taking power set to a high one.

Fourth Embodiment

Figure 14:
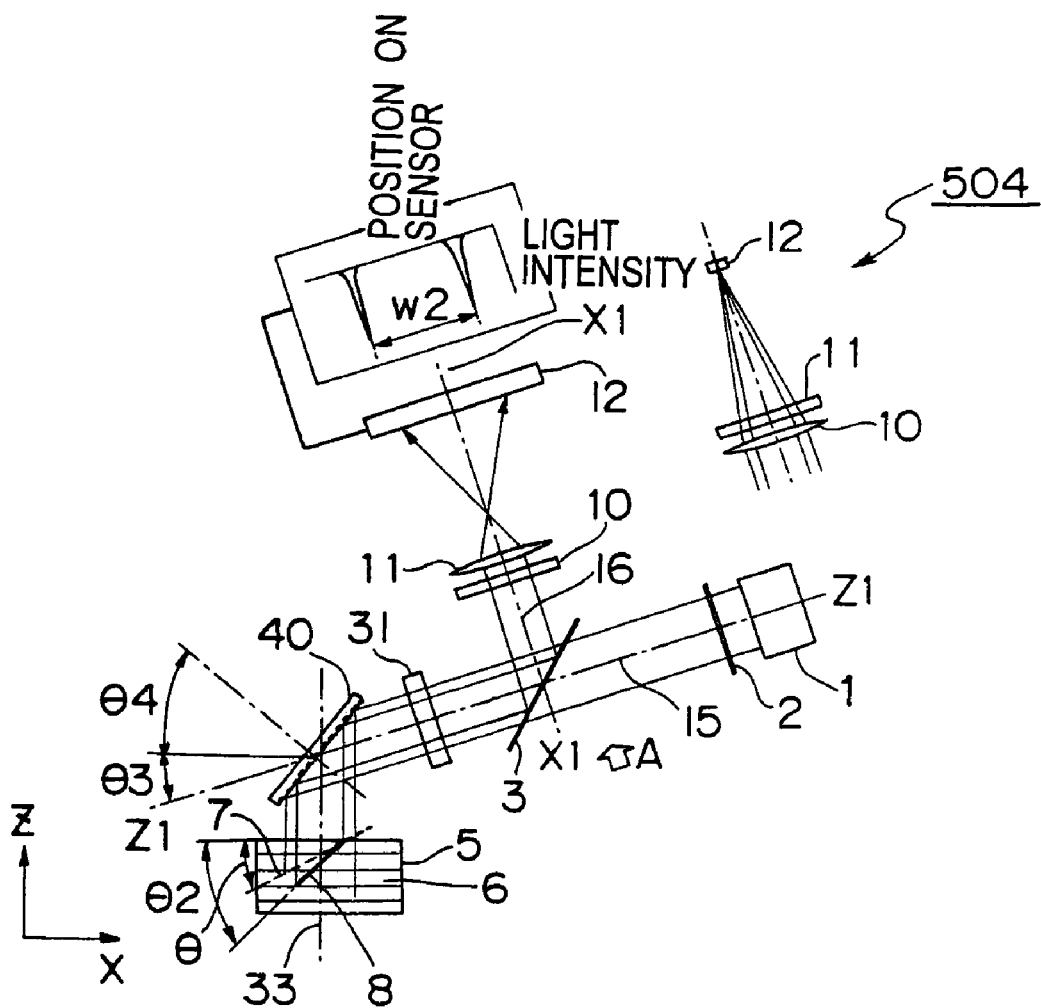
FIG. 14 is a schematic view of an interfacial position measuring apparatus according to a fourth embodiment of the invention.
Figure 15:
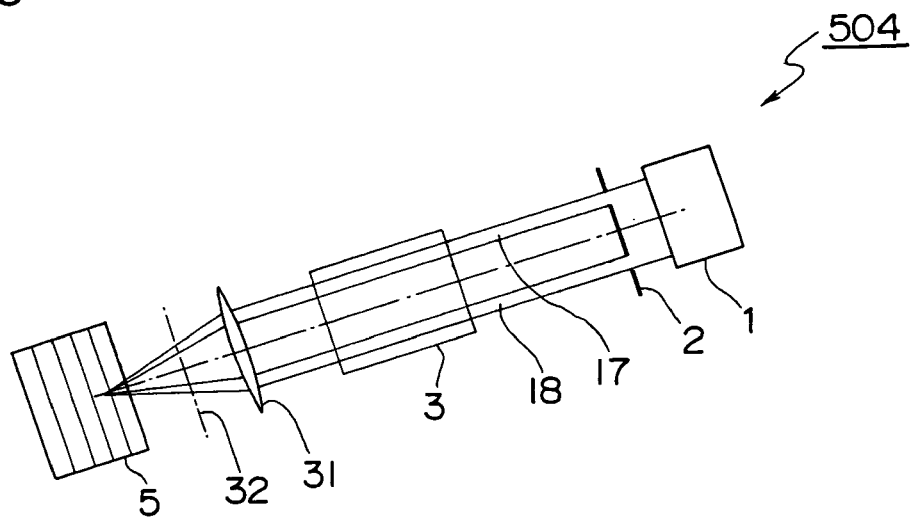
FIG. 15 is a Z sectional view of the interfacial position measuring apparatus in the fourth embodiment.

Next, FIG. 14 shows a schematic view of an interfacial position measuring apparatus 504 according to a fourth embodiment. Also, FIG. 15 shows a view of a Z1-Z1 cross section of FIG. 14, as viewed along a direction of the arrow A (a Z sectional view of the interfacial position measuring apparatus 504 in this fourth embodiment).

The optical axis 15 forms an angle θ3 to the X axis in the X-Z plane. The optical axis 33 is placed so as to be parallel to the Z axis, and the sample surface 6 is vertical to the Z axis.

The reflection type diffraction grating 40, which has a trench pitch 'p', the trenches being directed along the Y-axis direction (depth direction in the drawing sheet of FIG. 14), is so placed between the cylindrical lens 31 and the focal plane of the cylindrical lens that the normal line of the lattice formation plane is angled by an angle θ4 to the X axis in the X-Z plane. With a blades type diffraction grating used as a reflection type diffraction grating 40, the resulting diffracted light is only the first-order diffracted light in most part, which is diffracted principally toward a direction shown in FIG. 14.

Given a wavelength λ of the light source 1, θ3 and θ4 satisfy (Equation 12):

$$\sin(\theta 3+\theta 4)-\cos(\theta 4)=\lambda/p \quad \text{(Equation 12)}$$

With regard to the interfacial position measuring apparatus 504 constructed as shown above, its measuring operation is explained below.

Emission light from the light source 1 is formed by the slit plate 2 into two pencils of light 17, 18 symmetrical about the optical axis 15. The pencils of light 17, 18 are transmitted by the half mirror 3, going incident on the cylindrical lens 31. By the cylindrical lens 31, pencils of light within the X-Z plane are not condensed but pencils of light within the Z1-Z1 cross section are condensed. Emission light from the cylindrical lens 31 becomes incident on a reflection type diffraction grating 40 at an angle θin to the normal line of its lattice formation plane. With the counterclockwise direction taken as the positive direction, given the incident angle θin, an emission angle θout and a diffraction order m, then the grating equation is that $\sin(\theta in)+\sin(\theta out)=\pm m\times\lambda/p$. In this case, since only the first-order diffracted light is diffracted at the reflection type diffraction grating 40, it holds that m=1 and that incident angle θin=θ3+θ4, and therefore given an emission angle θout=−(90°−θ4) so that the emission light becomes parallel to the Z axis, then (Equation 12) is obtained.

Figure 16:
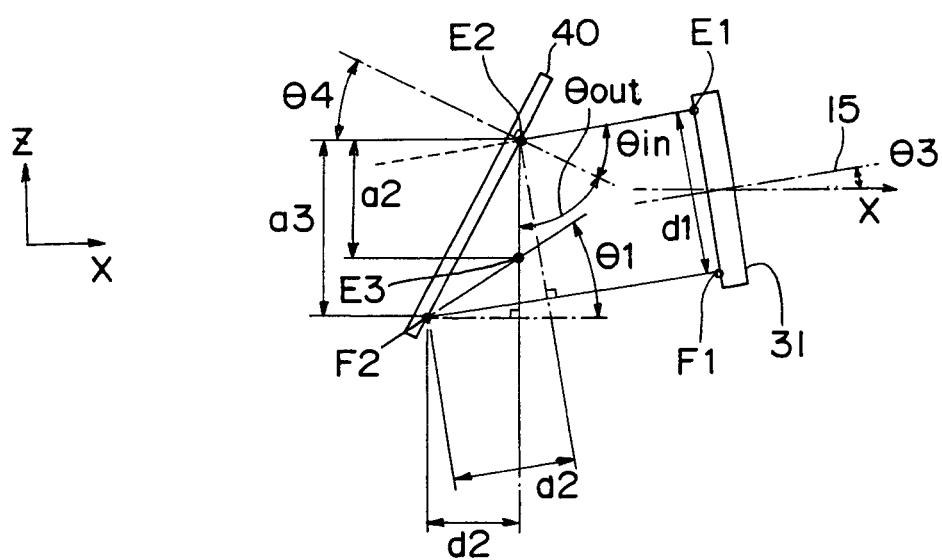
FIG. 16 is an explanatory view of a light-convergent point array inclination angle in the fourth embodiment.

FIG. 16 shows an explanatory view of a light-convergent point array inclination angle in the fourth embodiment.

In FIG. 16, an inclination angle θ1 of the light-convergent point array 7, which is formed from the cylindrical lens 31, formed to the sample surface 6 by the reflection type diffraction grating 40 is determined.

The light-convergent point array 7 is formed on a focal position of the cylindrical lens 31. This is the case also when the diffraction grating is placed between the cylindrical lens and the light-convergent points. From a straight line E3F2 parallel to the light-convergent point array 7, an inclination angle θ1 formed against the X axis is determined. Since the optical path length from the cylindrical lens 31 to any point on the straight line E3F2 is constant, an optical path length E1E2+E2E3 and an optical path length F1F2 are equal in distance, the length of those being a3=2×a2 from the relations that E1E2=a1, E2E3=a3−a2 and F1F2=a1+a2. Given an emission laser width d1 of the cylindrical lens 31 and an emission laser width d2 of the reflection type diffraction grating 40 in the X-Z plane, the inclination angle θ1 with respect to the X axis is expressed as $\tan(\theta 1)=a3/(2\times d2)$. Also, since $\tan(\theta 4)=a3/d2$, the incident angle is finally expressed as $\tan(\theta 1)=\{\tan(\theta 4)\}/2$.

The light-convergent point array 7 formed by the cylindrical lens 31 and the reflection type diffraction grating 40, having the inclination angle θ1 to the X axis in the air, results in a light-convergent point array 8 having the inclination angle θ2 in the sample 5, as in the first embodiment.

Then, as in the first embodiment, the light-convergent point array 8 is reflected by the interfaces 9 of the sample 5, passing again through the reflection type diffraction grating 40 and the cylindrical lens 31 and being formed into an image on the line sensor 12 by the cylindrical lenses 10, 11. Therefore, from light intensity peak positions on the line sensor 12, positions of the reflecting interfaces 9 inside the sample 5 can be measured.

Further, given a measurement range wz in the Z direction and a resolution wx in the X direction, then the width of the laser applied to the sample within the X-Z plane needs to be at least wx or less. Since the laser width in the X-Z plane is $d2/d1=\sin(\theta 4)/\cos(\theta 3+\theta 4)$ as a result of the diffraction by the diffraction grating based on that $E2F2\times\cos(\theta 3+\theta 4)=d1$ and $E2F3\times\sin(\theta 4)=d2$, the X-axis direction width in the slit plate 2 may appropriately be set to $wx\times\cos(\theta 3+\theta 4)/\sin(\theta 4)$ or less.

As shown above, in this fourth embodiment, since positions of the sample surface and a plurality of reflecting interfaces inside the sample can be measured simultaneously as in the first embodiment, high-speed measurement becomes achievable. Further, as in the second embodiment, since the cylindrical lens can be placed vertical to the pencils of light, there occurs no aberration due to the inclination of the lens. Furthermore, as in the third embodiment, in image formation onto the line sensor, an object plane (light-convergent point array) and an image formation plane (light-receiving surface of the line sensor) become parallel to each other, so that an image capture of distortion-free light intensity peaks can be achieved even with the image-taking power set to a high one.

Further, in this fourth embodiment, by the formation of a light-convergent point array skewed to the sample with the use of a reflection type diffraction grating, there occurs no spherical aberration due to the diffraction grating, so that distortions of light intensity peaks on the line sensor due to any spherical aberration or spherical aberration correction error do not occur. Therefore, high-accuracy measurement can be achieved. Moreover, since stray light due to top-and-bottom surface reflection within the transmission type diffraction grating does not occur, misdetections at the line sensor can be prevented.

Fifth Embodiment

Figure 17:
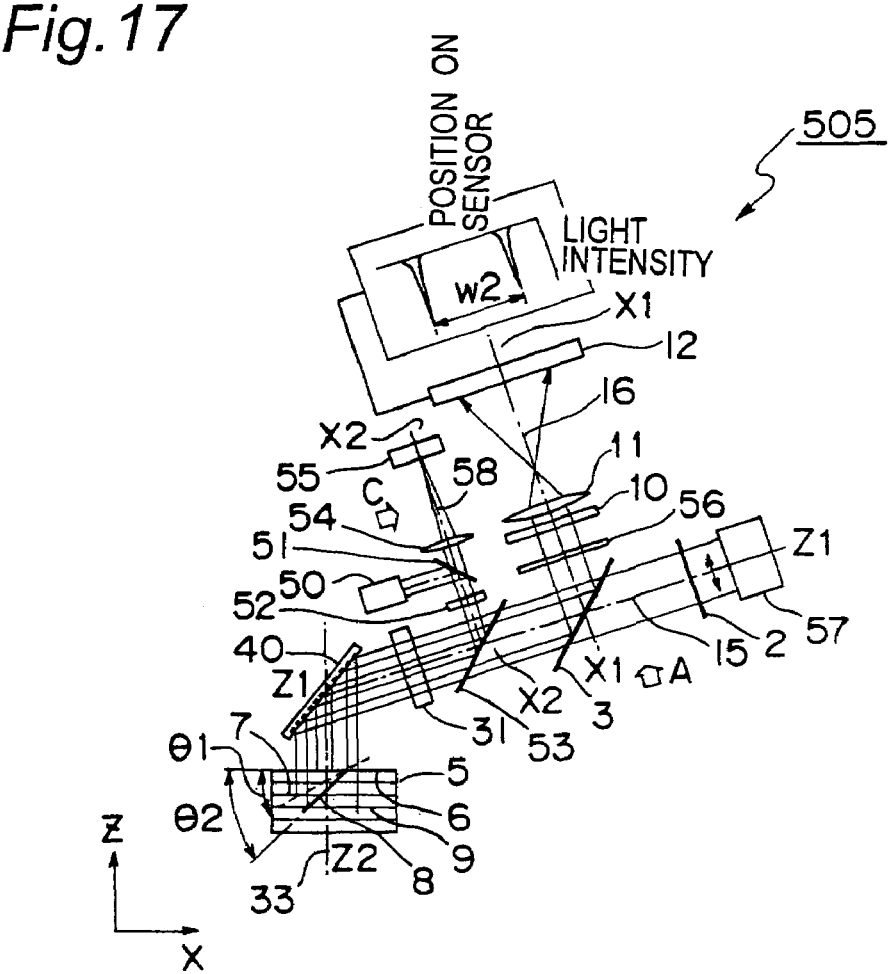
FIG. 17 is a schematic view of an interfacial position measuring apparatus according to a fifth embodiment of the invention.
Figure 18:
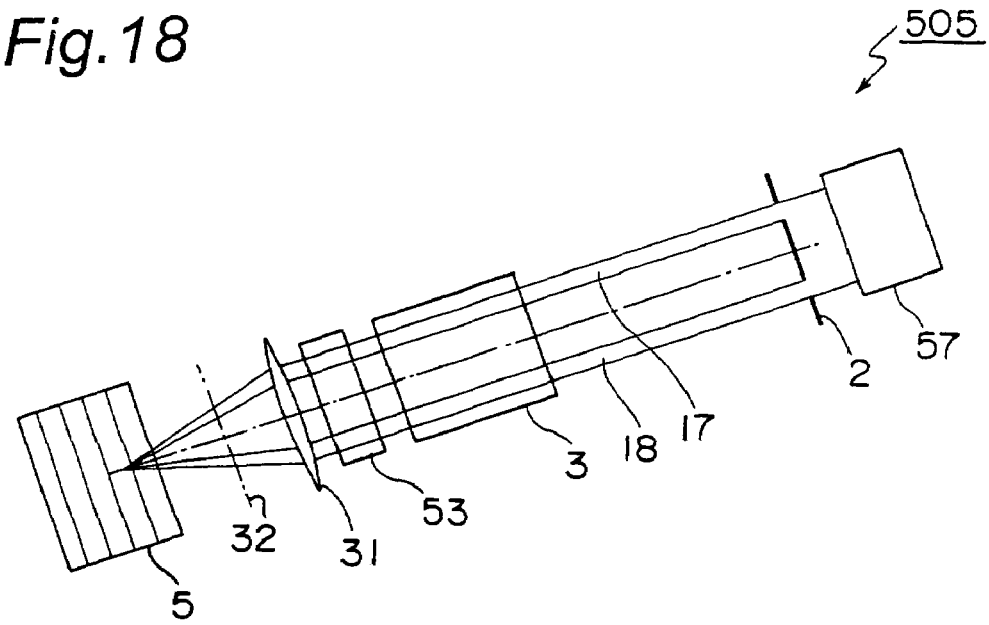
FIG. 18 is a Z sectional view of the interfacial position measuring apparatus in the fifth embodiment.
Figure 19:
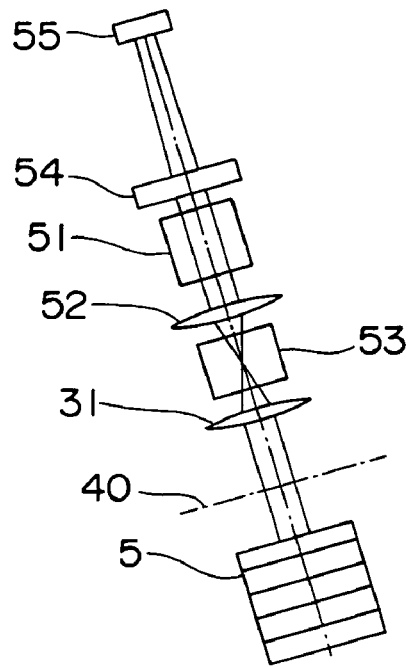
FIG. 19 is an X-Z sectional view of the interfacial position measuring apparatus in the fifth embodiment.

Next, FIG. 17 shows a schematic view of an interfacial position measuring apparatus 505 according to a fifth embodiment of the invention. Also, FIG. 18 shows a view of a Z1-Z1 cross section of FIG. 17, as viewed along a direction of the arrow A (a Z sectional view of the interfacial position measuring apparatus 505 in this fifth embodiment). FIG. 19 shows an X-Z sectional view of the interfacial position measuring apparatus 505 in the fifth embodiment, as a cross section by X2-X2 and Z1-Z1 of FIG. 17 is viewed along a direction of the arrow C.

A light source 57 for layer thickness measurement is similar to the light source 1 except that its polarization direction is parallel to the drawing sheet of FIG. 17.

A light source 50 for angular measurement emits parallel light, its polarization direction being vertical to the drawing sheet of FIG. 17. An optical axis of the light source 50 is set parallel to the optical axis 15.

A half mirror 51, on which emission light of the light source 50 comes incident, turns back its optical path by 90° within the drawing sheet of FIG. 17. An optical axis resulting after the optical axis of the light source 50 is turned back by the half mirror 51 is assumed as an optical axis 58.

A cylindrical lens 52, on which emission light of the half mirror 51 comes incident, has a lens center placed on the optical axis 58, where light in polarization directions parallel to the drawing sheet of FIG. 17 is not condensed but light in polarization directions vertical to the drawing sheet is condensed. An emission-side focal position of the cylindrical lens 52 is so positioned as to be coincident with an incidence-side focal position of the cylindrical lens 31.

A polarization beam splitter (hereinafter, referred to as PBS) 53 transmits. light parallel to the drawing sheet and reflects polarized light vertical to the drawing sheet. The polarization reflecting surface is placed at an angle of 45 degrees to the optical axis 15 within the drawing sheet, and the optical axis 58 passes through an intersection point between the optical axis 15 and the PBS 53.

A cylindrical lens 54 has its cylindrical axis placed along the depth direction of the drawing sheet of FIG. 17, and its lens center placed on the optical axis 58.

A line sensor 55 has a plurality of light-receiving elements placed in line along a direction vertical to the optical axis 58 within the drawing sheet. A light-receiving portion width of the line sensor 55 in the depth direction of the drawing sheet of FIG. 17 is set wide enough. Also, the light-receiving surface of the line sensor is placed on the emission-side focal position of the cylindrical lens 54.

A polarizing plate 56 allows only polarized light components parallel to the drawing sheet of FIG. 17, out of light reflected by the half mirror 3, to pass therethrough.

With regard to the interfacial position measuring apparatus 505 constructed as shown above, its measuring operation is explained below.

Emission light of the light source 57, which is polarized along a direction parallel to the drawing sheet of FIG. 17 so as to become p-polarized light as viewed from the PBS 53, is transmitted therethrough. Since the polarization direction is kept unchanged in reflection at the sample 5, the light results entirely in transmitted light at the PBS 53. A transmission axis of the polarizing plate 56 is directed parallel to the drawing sheet of FIG. 17, so that polarized components vertical to the drawing sheet are completely removed at this point. Thus, as in the fourth embodiment, distances from the sample surface 6 to internal interfaces 9 can be measured.

Next, emission parallel light of the light source 50 is transmitted by the half mirror 51, going incident on the cylindrical lens 52. The light, keeping parallel light within the drawing sheet of FIG. 17, goes incident on the PBS 53. Since the polarization direction of the light source 50 is vertical to the drawing sheet of FIG. 17, the light results in s-polarized light with respect to the PBS 53, being reflected. The reflected light becomes parallel light parallel to the optical axis 15. This light pencil is diffracted by the reflection type diffraction grating 40 as it keeps parallel light within the drawing sheet, being reflected by the reflection type diffraction grating 40 and going incident on the sample 5. Given an incident angle $\epsilon$ of the normal line of the sample surface 6 to the optical axis 33, the reflected light is angled by $2\epsilon$ with respect to the optical axis 33. The reflected light by the sample surface 6, which is not changed in polarization state, is diffracted by the reflection type diffraction grating 40, reflected by the PBS 53, passing through the cylindrical lens 52 and going incident on the cylindrical lens 54. Given a focal length f1 of the cylindrical lens, the light converges at a position of $f1 \times \tan(2\epsilon)$ on the line sensor 12.

Meanwhile, in the depth direction of the drawing sheet of FIG. 17, parallel light from the light source 50 is reflected by the half mirror 51 and thereafter condensed by the cylindrical lens 52. Since the emission-side focal position of the cylindrical lens 52 and the incidence-side focal position of the cylindrical lens 31 are coincident with each other, the emission light of the cylindrical lens 31 becomes parallel light. Therefore, the parallel light parallel to the optical axis 33 is parallel also to the sample 5. Reflected light by the sample 5 is diffracted again by the reflection type diffraction grating 40, passing through the cylindrical lens 31, the PBS 53 and the cylindrical lens 52, resulting in parallel light. Since the light is not condensed in the depth direction of the drawing sheet in the cylindrical lens 54, parallel light goes incident on the light-receiving portion of the line sensor 55.

Next, effects of an inclination of the sample 5 on the film thickness measurement are described, and a method for performing correct film thickness measurement by using the inclination measurement results is described.

Figure 20:
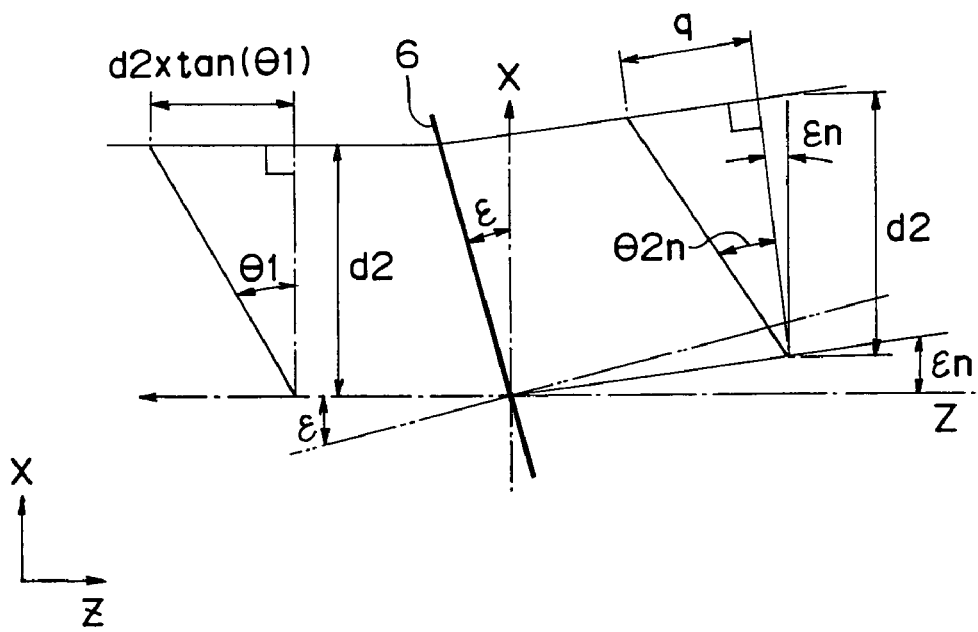
FIG. 20 is a view showing a light-convergent point array inside a sample in the fifth embodiment.

FIG. 20 shows a view showing a light-convergent point array inside a sample in the fifth embodiment.

First, an inclination angle of a light-convergent point array to the X axis within a sample, due to an inclination of a sample, is determined. From FIG. 20, with the sample 5 inclined by an angle $\epsilon$, a resulting angle $\theta 2$ of the light-convergent point array 8 to the X axis within the sample is $\theta 2=(\theta 2n+\epsilon n)$. In this case, $\epsilon n$ is given by Snell's law, $\sin(\epsilon)=n \times \sin(\epsilon n)$. In the X-Z plane, apparently, a factor of kxz=(f−S)/u applies to the length within the sample having a refractive index 'n'. This is shown, in FIG. 5, by a ratio of a focal position in the air to another focal position within the sample 5 from the sample surface 6. Therefore, 'q' in the figure results in $q=d2 \times \tan(\theta 1) \times kxz$, so that $\theta 2n$ is expressed by (Equation 13):

$$\tan(\theta 2n) = \frac{q}{d2 \times \cos(\epsilon n)} = \frac{\tan(\theta 1) \times kxz}{\cos(\epsilon n)} \qquad \text{(Equation 13)}$$

where $\sin(\theta 2)=n \times \sin(\theta 2n)$ and $\sin(\epsilon)=n \times \sin(\epsilon n)$.

Figure 21:
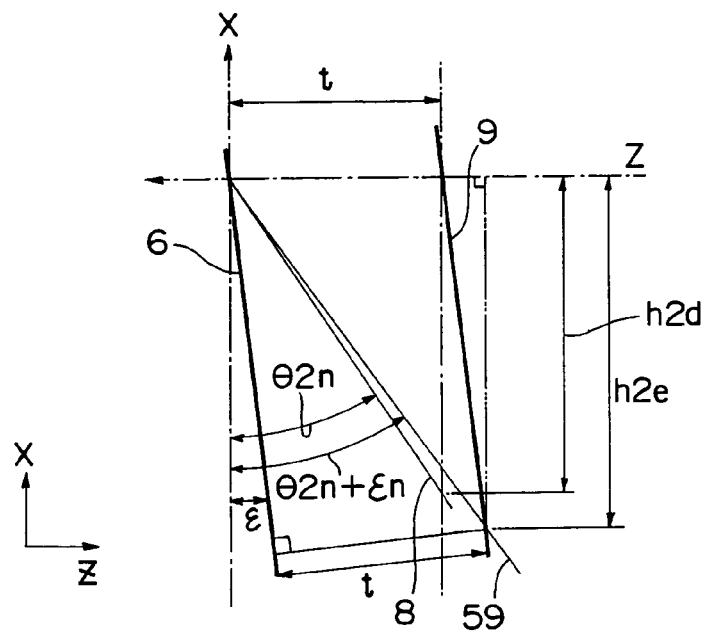
FIG. 21 is a view showing a positional relationship among the light-convergent point array, the surface and the reflecting interface in the fifth embodiment.

FIG. 21 is a view showing a positional relationship among a light-convergent point array, the surface and the reflecting interface in the fifth embodiment, where the light-convergent point array is formed within a sample 5 with an inclination angle by $\epsilon$ with respect to the X axis.

Referring to FIG. 21, a light-convergent point array 8 is formed within the sample when the sample is not inclined, while a light-convergent point array 59 results with the sample inclined by $\epsilon$. A distance from the sample surface 6 to an interface 9 is represented by 't', a distance h2d in the X-axis direction from the light-convergent point array 8 without any inclination of the sample 5 to an intersection point between the sample surface 6 and the interface 9 is expressed as $h2d=t/\tan(\theta 2n)$, and a distance h2e in the X-axis direction from the light-convergent point array 59 with the inclination of the sample 5 to the intersection point between the sample surface 6 and the interface 9 is expressed as $h2e=t \times \cos(\theta 2n+\epsilon n)/\sin(\theta 2n+\epsilon n-\epsilon)$. Accordingly, the distance between intersection points is multiplied by $\eta$ by the inclination of the sample to the X axis, hence $$\eta = \frac{h2e}{h2d} = \frac{\cos(\theta 2n + \epsilon n) \times \tan(\theta 2n)}{\tan(\theta 2n)} \qquad \text{(Equation 14)}$$

This is applicable also to intervals between light intensity peak positions observed by the line sensor 12.

Consequently, as layer thickness measurement of the sample 5, from the distance 't' from the sample surface 6 to the interface 9 measured with the sample 5 inclined, the inclination measurement result $\epsilon$ on the sample surface 6 and the inclination angle θ1 of the light-convergent point array in the air, t/η is determined and taken as a measured value, by which errors due to an inclination of the sample can be prevented. It is noted that θ1 is given by (Equation 13), θ2n is given by Snell's law, sin(θ2)=n×sin(θ2n), and that εn is given by Snell's law, sin(ε)=n×sin(εn).

As described above, in the fifth embodiment, since the sample surface and a plurality of interfacial positions inside the sample can be measured simultaneously as in the fourth embodiment, high-speed measurement becomes achievable. Further, by measuring the inclination angle of the sample surface and correcting measured values of the sample surface and internal interfacial positions, high-precision film thickness measurement can be achieved. Moreover, since the measurement can be done even with the inclination angle of the sample changed during the measurement, it is implementable that while an optical disc or other circular disc as an example is being rotated, its internal interfacial positions can be measured.

Sixth Embodiment

Figure 22:
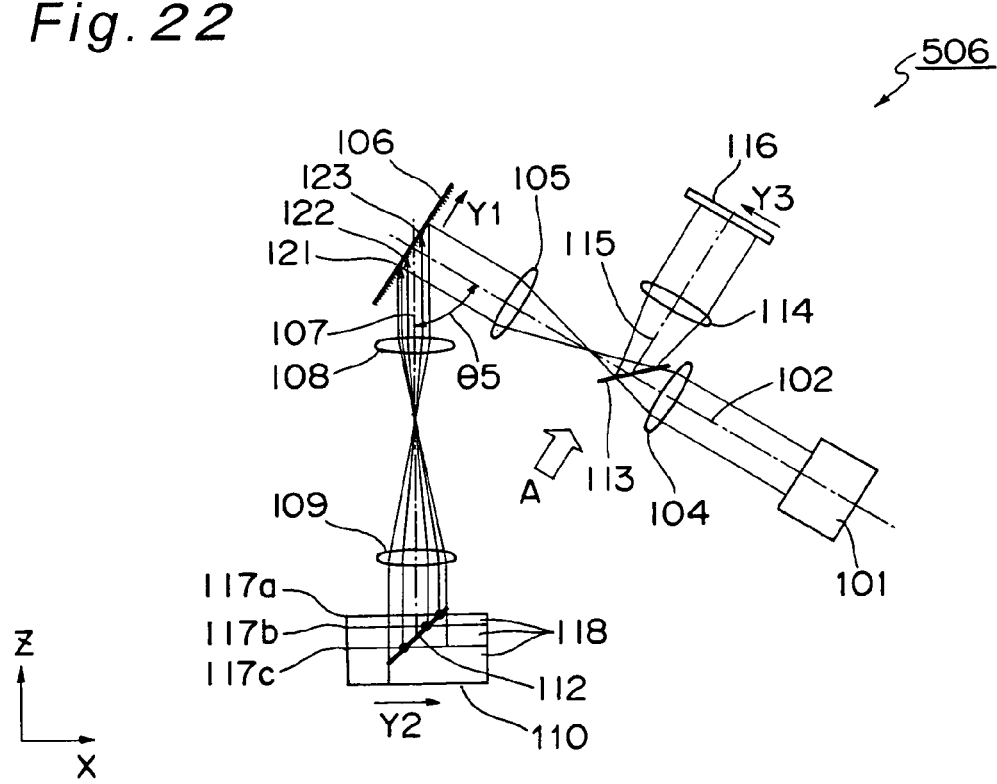
FIG. 22 is a schematic view of an interfacial position measuring apparatus according to a sixth embodiment of the invention.

Next, FIG. 22 shows a schematic view of an interfacial position measuring apparatus 506 according to a sixth embodiment of the invention.

Referring to FIG. 22, a light source 101 emits roughly monochromatic parallel light. The light source 101 is, for example, such that emission light of a semiconductor laser is parallelized by a lens. The light source 101 has a wavelength λ2=405 nm. An optical axis 102 is parallel to the emission light of the light source 101, showing a generally center of a light intensity distribution or light intensity centroid. A cylindrical lens 104 has a cylindrical axis perpendicular to the optical axis 102, being placed depthwise of the drawing sheet of FIG. 22. A lens 105, which has a lens center and a focal position both placed on the optical axis 102, is so positioned that its focal position on the light source 101 side is placed on the focal line of the cylindrical lens 104.

A reflection type diffraction grating 106 has a lattice trench formation plane vertical to the optical axis 102 and placed at an emission-side focal position of the lens 105. In the reflection type diffraction grating 106, lattice trenches are formed in the depth direction of the drawing sheet of FIG. 22. Given a lattice trench pitch 'p', since the light source wavelength is λ2, a first-order diffraction angle θ5 is given by θ5=sin$^{-1}$(λ2/p). In this case, if the lattice trench pitch is p=1/2400 mm (0.417 μm), then a first-order diffraction angle θ is θ=76.4°. Since λ/p<1, the lattice trench pitch 'p' is restricted as p<λ. Further, as coordinate axes, a direction vertical to the optical axis 102 within the drawing sheet of FIG. 22 is assumed as Y1, and a depth direction of the drawing sheet is assumed as X1. The grating is assumed as a blades type grating having a sawtooth cross section.

An optical axis 107 is directed toward a first-order diffraction angle direction with respect to the optical axis 102. The lattice trench direction of the diffraction grating 106 is placed along the depth direction of the drawing sheet of FIG. 22, so that the optical axis 107 is placed within the drawing sheet. Lenses 108, 109, which have their lens centers and focal positions placed on the optical axis 102, are so placed that the incidence-side focal position of the lens 108 is coincident with an intersection point between the optical axis 107 and the diffraction grating 106. The lens 109 is so positioned that the emission-side focal position of the lens 108 and the incidence-side focal position of the lens 109 are coincident with each other.

A sample 110, whose surface 117a is a plane, internally has a plurality of interfaces 117 (117b, 117c, . . . ) which are generally parallel to the surface and which reflect part of incident light. The interfaces 117 are formed between transparent substrates 118. The sample 110 is so placed that a focal position of the lens 109 on the sample 110 side is located at a generally center of the measurement-object interfaces 117 of the sample 110, and that the normal-line direction of a sample surface 117a and an optical axis 107 become generally parallel to each other. As coordinate axes, a horizontal direction of FIG. 22 (i.e., a direction vertical to the optical axis 107 within the drawing sheet of FIG. 22) is assumed as Y1, and a depth direction of the drawing sheet is assumed as X2.

A half mirror 113 is so placed that its reflecting surface is angled by generally 45 degrees on the optical axis 102. An optical axis resulting after the optical axis 102 is reflected by the half mirror is assumed as an optical axis 115. A lens 114 has its lens center on the optical axis 115, and a combination of the lens 105 and the lens 114 allows an image of the lattice plane of the diffraction grating 106 into formed on the plate at which a line sensor 116 is placed.

The line sensor 116 has a sensor light-receiving surface placed at an emission-side focal position of the lens 114. The position of the sensor light-receiving surface is set at a position at which light-convergent points formed on the diffraction grating 106 by reflected light from the interfaces of the sample 110 are imaged by the lenses 105, 114. The light-convergent points are formed at generally mid-portions in the depth of the lattice trenches of the diffraction grating.

With regard to the interfacial position measuring apparatus 506 constructed as shown above, its measuring operation is explained below.

Figure 23:
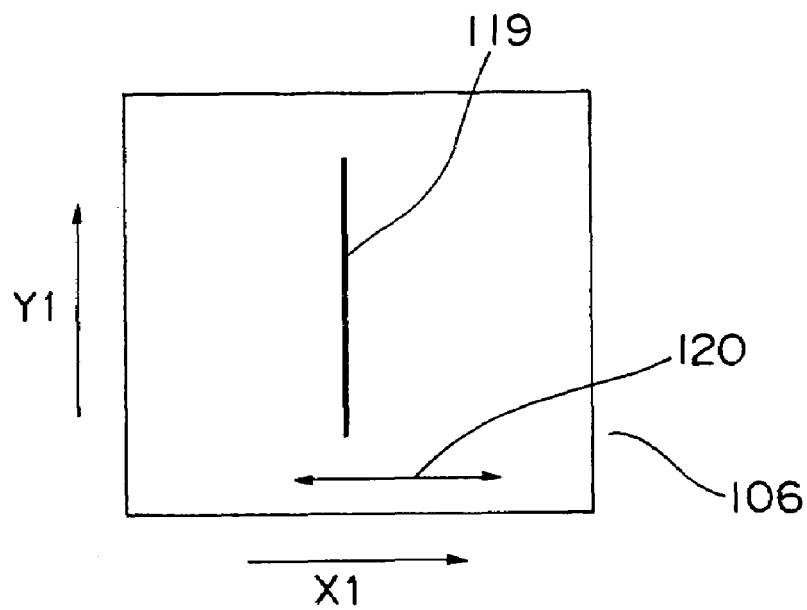
FIG. 23 is a view showing a light intensity pattern on a diffraction grating in the sixth embodiment.

Emission light of the light source 101 is projected by the cylindrical lens 104 and the lens 105 on the diffraction grating 106 at a focal length ratio in a cross section vertical to the cylindrical axis of the cylindrical lens 104. In a cross section parallel to the cylindrical axis of the cylindrical lens 104, emission light of the light source 101 passes through the cylindrical lens 104, being condensed on the diffraction grating 106 by the lens 105. Accordingly, on the diffraction grating 106, a light-convergent line 119 is formed as shown in FIG. 23, which is a view showing a light intensity pattern on the diffraction grating 106 in this sixth embodiment. The cylindrical axis of the cylindrical lens 104 is placed along the depth direction of the drawing sheet of FIG. 22, and light is condensed by the lens 105, so that the light-convergent line 119 becomes vertical to the direction of the diffraction grating trenches, i.e., parallel to the Y1 direction. Incident light on the diffraction grating 106 is diffracted so as to be directed along the optical axis 107. The lenses 108, 109 constitute an image formation system, by which the light-convergent line 119 on the diffraction grating 106 is imaged into the sample 110, forming a light-convergent line 112. Since the diffraction grating 106 is inclined by 76.4° with respect to the optical axis 107, the light-convergent line 112 formed in the sample 110 is also so formed as to be inclined with respect to the sample and intersect measurement-object interfaces.

Figure 24:
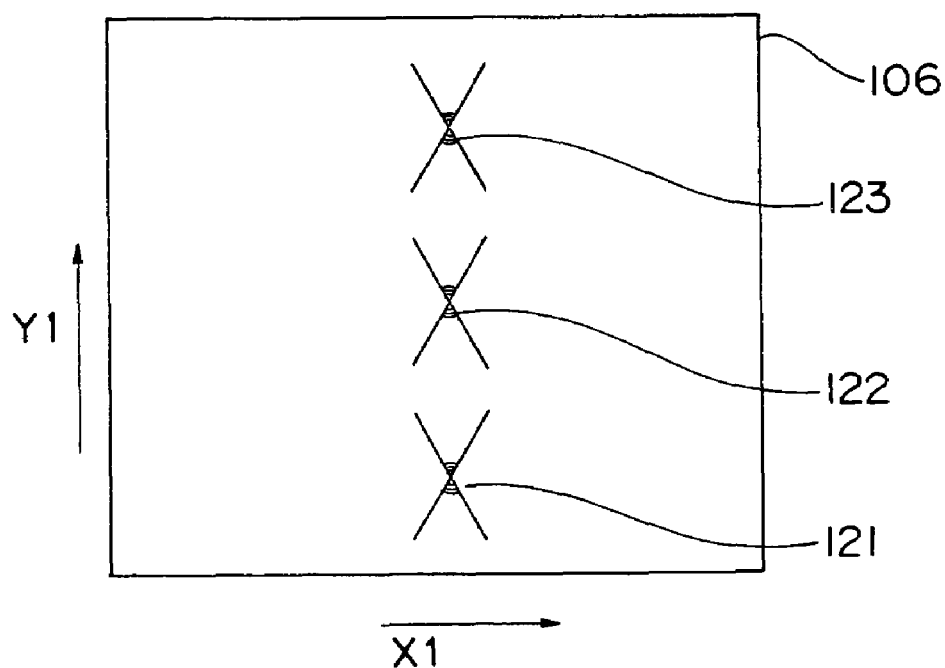
FIG. 24 is a view showing a return light intensity pattern on the diffraction grating in the sixth embodiment.

Interfacial reflected light of the light-convergent line 112 is turned back to the diffraction grating 106 by the lenses 108, 109. The light-convergent line 112 in the sample 110 and the light-convergent line 119 on the diffraction grating 106 are set in one-to-one correspondence by the lenses 108, 109, so that intersection points between the light-convergent line 112 and the interfaces in the sample, i.e. reflected light from the light-convergent points, form also on the diffraction grating 106. Except for the intersection points, light of the light-convergent line 112 diverges as it moves along the Y2 direction, and the light diverges also on the diffraction grating 106 along the Y1 direction with its width spread. Accordingly, as shown in FIG. 24, which is a view showing a return light intensity pattern on the diffraction grating 106 in the sixth embodiment, the light intensity distribution on the diffraction grating 106 results in an X-like distribution of reflected light from the individual interfaces. That is, light-convergent points by a first interface (surface) 117a, a second interface 117b and a third interface 117c result in light-convergent points 121, 122, 123, respectively, on the diffraction grating 106. The interfaces are parallel to the surface and the light-convergent line 112 is formed into a linear shape, so that positions of the light-convergent points 121, 122, 123 are arrayed in proportion to interface-to-interface distances and in a linear shape.

Figure 25:
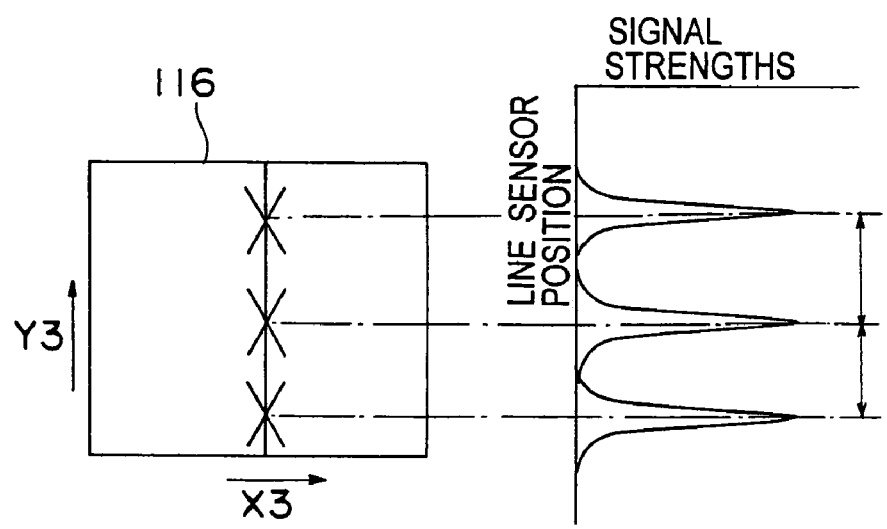
FIG. 25 is a view showing a light intensity pattern on the line sensor in the sixth embodiment.

The light intensity distribution on the diffraction grating 106 is imaged by the lenses 105, 114, as shown in FIG. 25, which is a view showing a light intensity pattern on the line sensor 116 in this sixth embodiment. The light-convergent points are points of intersection of X in FIG. 25. As a result, signals corresponding to the light-convergent points can be obtained from the line sensor 116.

Detecting peak positions of the signals allows the positions of the interfaces from the sample surface to be measured. The surface position can be detected, for example, by taking, as the surface position, the signal that is first detected when the sample 110 is brought from a position sufficiently distant from the sample-side focal position of the lens 109 closer thereto. The surface position can be detected also by forming a line enough larger than the thickness of the substrate and irradiating the substrate with the line. As for the calculation of interfacial positions from distances between the signal peaks, by preliminarily measuring a sample having known interface-to-interface optical distances and determining factors of interface-to-interface optical distances with respect to the resulting peak-to-peak distances of the signals, correct interfacial optical lengths from the surface can be obtained from the peak-to-peak distances of the signals with respect to any sample. Given a refractive index of a sample, individual interfacial distances from the sample surface can be calculated.

In this connection, generally, when a diffraction grating is provided on the way of convergence of parallel light by a lens or the like to condense its diffracted light, the diffracted light, even if the light is monochromatic light, does not converge to one point.

Figure 26:
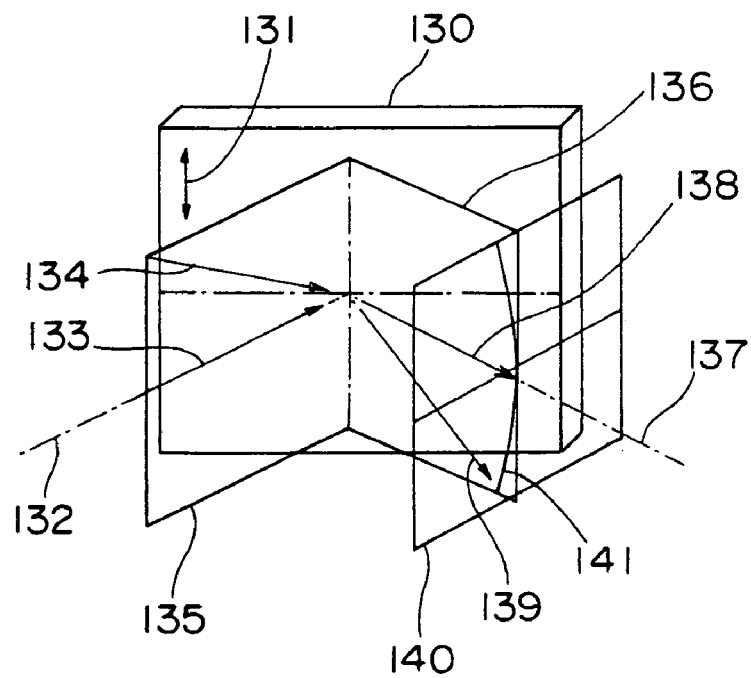
FIG. 26 is a view for explaining a general phenomenon in diffraction of light by a diffraction grating.

An explanatory view of such a phenomenon that diffracted light does not converge to one point is shown in FIG. 26. As shown in FIG. 26, an optical axis 132 is taken on a principal section, i.e., a plane that is vertical to the lattice trench direction and parallel to the normal line direction of the lattice plane, an incidence plane 135 is given by a plane containing the optical axis 132 and parallel to a lattice trench direction 131, an optical axis 138 is given by a diffraction direction of the optical axis 132, an emission plane 136 is given by a plane containing an optical axis 137 and parallel to the lattice trench direction 131, and a projection plane 140 is given by a plane vertical to the optical axis 137 and the emission plane 136.

A light beam 133 parallel to the optical axis 132 on the incidence plane 135 is diffracted by a diffraction grating 130, becoming a light beam 138. The light beam 138 is on the emission plane 136. However, a light beam 134 that is not parallel to the principal section within the incidence plane 135, when diffracted by the diffraction grating 106, results in a light beam 139, but the light beam 139 is not present on the emission plane 136 but passes on a line 141 on a circular arc in the projection plane 140. This is because in the diffraction, a light beam not present in the principal section increases in the angle of diffraction as the apparent trench pitch of the grating becomes smaller (see, e.g., Masao Tsuruta, Applied Optics I, published by Baifukan, pp. 296).

With respect to such a phenomenon of diffracted light, in this sixth embodiment, the light-convergent line 119 is formed on the diffraction grating 106, and its image is re-formed by using the lenses 108, 109 for the sample 110. As a result, the position of image formation is not changed even with the diffraction angle changed in the diffraction grating due to an incident angle, so that a distortion-free light-convergent line can be obtained.

In the sixth embodiment, a two-lens image formation system has been described as an example. However, only if aberration-related issues can be solved, the sixth embodiment can be used also for a one-lens image formation systems.

The case is the same also with return light from the sample. Since a light-convergent point is formed on the diffraction grating 106, the position of the light-convergent point formed on the line sensor 116 by the image formation system including the lens 105 and the lens 114 is not changed even if the azimuth of the light beam from the light-convergent point has been changed by the diffraction.

Therefore, micro light-convergent points can be formed on the line sensor, so that improvement in measurement accuracy for the individual interfacial positions from the surface as well as close interface-to-interface position measurement can be achieved.

Seventh Embodiment

Figure 27:
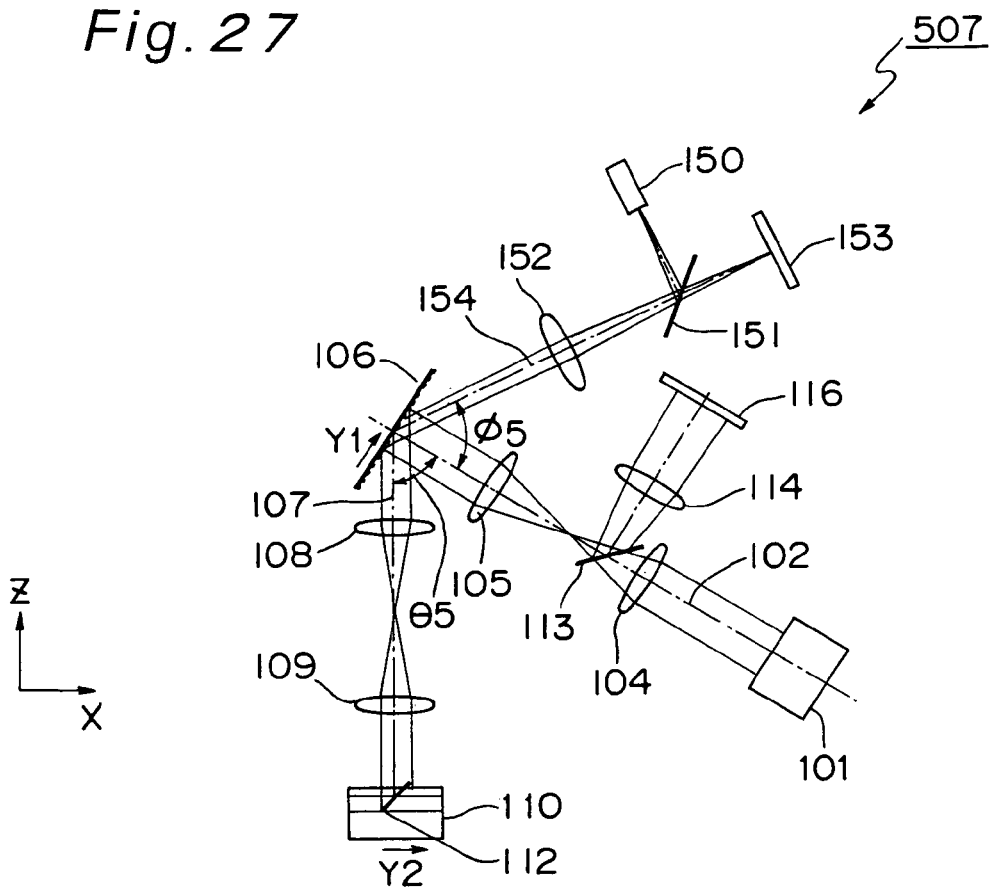
FIG. 27 is a schematic view of an interfacial position measuring apparatus according to a seventh embodiment of the invention.

FIG. 27 is a schematic view of an interfacial position measuring apparatus 507 according to a seventh embodiment of the invention.

A light source 150, which is a monochromatic point light source different in wavelength from the light source 101, is a semiconductor laser as an example. The light source wavelength is assumed as $\lambda 2$. For example, it is assumed that $\lambda 2 = 635$ nm in this seventh embodiment.

An optical axis 154, which is within the drawing sheet of FIG. 27, passes through an intersection point between the optical axis 102 and the diffraction grating 106, forming an angle $\phi 5$ with respect to the optical axis 102, i.e., the normal line of the diffraction grating 106. In order that the optical axis 154 functions as regular reflection of the optical axis 107 with respect to the diffraction grating 106, it is assumed that $\phi 5 = \theta 5$. In this case, $\phi 5 = \theta 5 = 76.4°$.

A half mirror 151, which is placed at an angle of generally 45 degrees on the optical axis 154, reflects emission light of the light source 150 toward the direction of the optical axis 154.

A lens 152 parallelizes the emission light of the light source 150.

A position sensor 153, which is placed on the optical axis 154, acts to measure positions of light-convergent points by the lens 152, and is given by a PSD, line sensor or the like as an example.

With regard to the interfacial position measuring apparatus 507 constructed as shown above, its measuring operation is explained below.

Emission light of the light source 150 is parallelized by the lens 152, going incident on the diffraction grating 106. The diffraction grating 106, which is optimized for the wavelength $\lambda$, allows a regular reflection component to occur for the wavelength $\lambda 2$, the light being reflected in the direction of the optical axis 107. Light emitted from the diffraction grating 106 passes through the lenses 108, 109, becoming parallel light again. Since the surface of the sample 110 and the internal interfaces are mutually parallel and flat, the reflected light results in parallel light angled by an angle two times larger than the inclination angle of the sample. Reflected light from the sample 110 passes again through the lenses 108, 109, being diffracted by the diffraction grating 106 and partly returned to proximities to the optical axis 154. In this case, the angle formed with the optical axis 154 is generally proportional to the inclination angle of the sample on condition that the inclination angle of the sample is a small one. The light that is reflected by the diffraction grating 106 and that has passed through the lens 152 converges onto the position sensor 153. Since the position of convergence on the position sensor 153 is generally proportional to the inclination angle of the sample surface, the inclination angle of the sample surface can be determined.

In the interfacial position measuring apparatus 507 constructed in this seventh embodiment, position measurement of individual interfaces from the surface of the sample 110 is similar to that of the sixth embodiment. In this interfacial position measuring apparatus 507, since the distances from the surface to the individual interfacial positions are measured from positions of intersection points with the interfaces by making the light-convergent line 112 inclined with respect to the sample surface, an inclination of the normal line of the sample to the optical axis 107 surface would cause errors in distance measured values from the sample surface to the individual interfaces. Therefore, by measuring an inclination amount of the sample measured by the light source 150 to the position sensor 153 and correcting the interfacial position measured values, such measurement errors can be reduced. As a correction method by using the sample inclination amount, a sample of known interface-to-interface optical distances is used, and variations of measured values relative to inclination amounts caused by inclination of the sample are preliminarily measured, by which inclination factors are acquired. Thus, for any arbitrary sample, interface-to-interface optical distances of less errors can be measured by measuring a sample inclination angle and multiplying the result by an inclination factor. Also, given a refractive index, actual distances between interfaces can be calculated.

Eighth Embodiment

Figure 28:
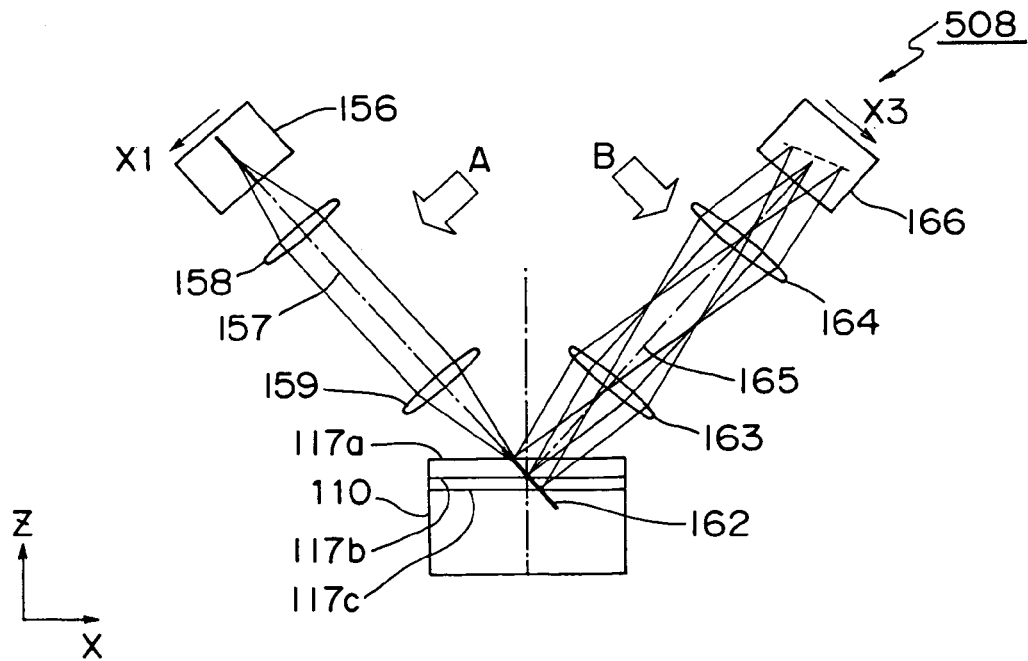
FIG. 28 is a schematic view of an interfacial position measuring apparatus according to an eighth embodiment of the invention.
Figure 29:
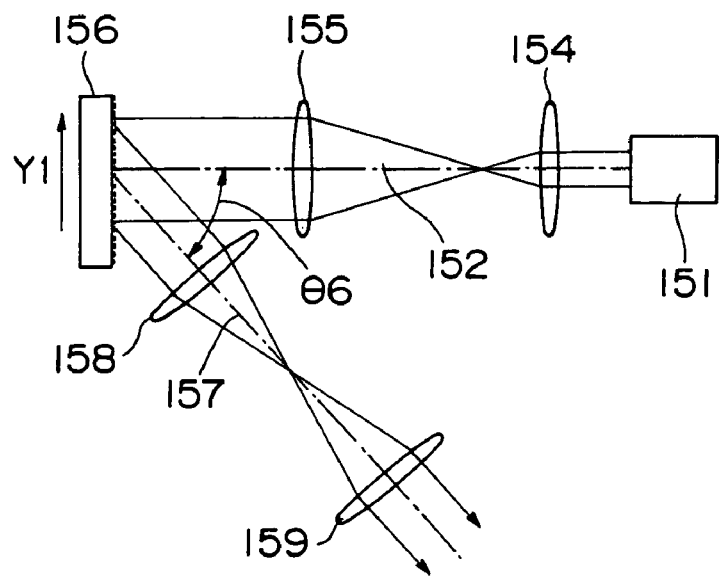
FIG. 29 is a view taken along an arrow A in the eighth embodiment.
Figure 30:
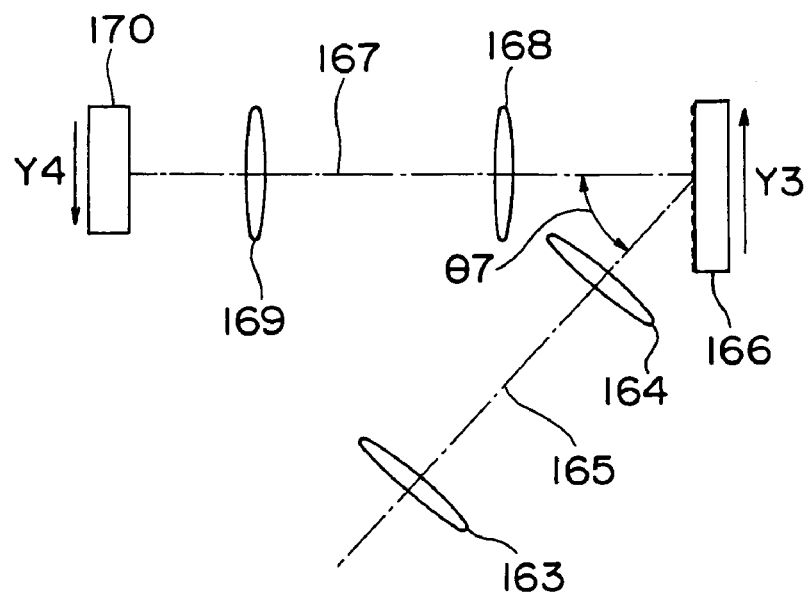
FIG. 30 is a view taken along an arrow B in the eighth embodiment.

FIGS. 28 to 30 are schematic views of an interfacial position measuring apparatus 508 according to an eighth embodiment of the invention.

In the sixth embodiment, light of a light-convergent line formed on the diffraction grating is applied so as to be incident generally vertically on the sample surface, by which reflected light beams are imaged on one identical diffraction grating. Instead, in this eighth embodiment, light is applied so as to be incident diagonally on the sample, and light-convergent points of light reflected in the regular reflection direction are formed on the line sensor by a light-receiving optical system including a diffraction grating other than the incidence optical system.

FIG. 28 is a view in which a normal line direction of the sample surface is charted within the drawing sheet. A view taken along an arrow A in FIG. 28 is shown in FIG. 29, and a view taken along an arrow B is shown in FIG. 30. Referring to FIG. 29, a light source 151 emits parallel monochromatic light, where emission light of a semiconductor laser is parallelized by a lens. The light source 151 has a wavelength $\lambda$.

An optical axis 152 is parallel to the emission light of the light source 151, showing a generally center of a light intensity distribution or light intensity centroid. A cylindrical lens 154 has a cylindrical axis perpendicular to the optical axis 152, being placed depthwise of the drawing sheet of FIG. 29.

A lens 155, which has a lens center and a focal position both placed on the optical axis 152, is so positioned that its focal position on the light source 151 side is placed on the focal line of the cylindrical lens 154.

A reflection type diffraction grating 156 has a lattice trench formation plane vertical to the optical axis 152 and placed at an emission-side focal position of the lens 155. Lattice trenches of the reflection type diffraction grating 156 are formed in the depth direction of the drawing sheet of FIG. 29. Given a lattice trench pitch 'p3', since the light source wavelength is $\lambda$, a first-order diffraction angle θ6 is given by θ6=sin⁻($\lambda$/p3). Further, as coordinate axes, a direction within the drawing sheet of FIG. 29 is assumed as Y1, and a depth direction of the drawing sheet is assumed as X1. The diffraction grating is assumed as one whose lattice cross section is formed, for example, into a sinusoidal shape having a depth optimized to the wavelength, or a sawtooth shape, so that light converges in the first-order diffraction direction.

An optical axis 157 is directed toward a first-order diffraction angle direction with respect to the optical axis 152. The lattice trench direction of the diffraction grating 156 is placed along the depth direction of the drawing sheet of FIG. 29, so that the optical axis 157 is placed within the drawing sheet.

Lenses 158, 159, which have their lens centers and focal positions placed on the optical axis 152, are so placed that the incidence-side focal position of the lens 158 is coincident with an intersection point between the optical axis 157 and the diffraction grating 156. The lens 159 is so positioned that the emission-side focal position of the lens 158 and the incidence-side focal position of the lens 159 are coincident with each other.

The optical axis 157 is within the drawing sheet of FIG. 28. A sample 110 is so placed that the focal position of the lens 159 is located at a generally center of measurement-object interfaces of the sample 110.

An optical axis 165, which is directed along a regular reflection direction of the optical axis 157 with respect to the surface of the sample 110, passes through the sample-side focal position of the lens 159, being within the drawing sheet of FIG. 28.

A lens 163 has a lens center placed on the optical axis 165 and a sample-side focal position placed generally at the sample-side focal position of the lens 159.

A lens 164 is so positioned that its lens center is placed on the optical axis 165 and its sample-side focal position is placed at the diffraction grating 166 side focal position of the lens 163.

Designated by numeral 166 is a diffraction grating. In FIG. 30, the optical axis 165 is within the drawing sheet and directed along the first-order diffraction direction of the diffraction grating 166. Trenches of the diffraction grating 166 are directed along the depth direction of the drawing sheet of FIG. 30. Given a trench pitch 'p4', an angle θ7 formed by the lattice-plane normal line direction of the diffraction grating 166 and the optical axis 165 is θ7=sin⁻¹($\lambda$/p4). For example, if p4=1/2400 mm, then θ7=76.4° because $\lambda$=405 nm.

Further, as coordinate axes, a direction within the drawing sheet of FIG. 30 is assumed as Y3, and a depth direction of the drawing sheet is assumed as X3. The diffraction grating is assumed as one whose lattice cross section is formed, for example, into a sinusoidal shape having a depth optimized to the wavelength, or a sawtooth shape, so that light converges in the first-order diffraction direction.

An optical axis 167 is directed toward a lattice-plane normal line direction of the diffraction grating 166.

A lens 168, which has a lens center and a focal position both placed on the optical axis 167, is so placed that the diffraction grating 166 plane is located at the incidence-side focal position.

A lens 169 has a lens center and a focal position both placed on the optical axis 167.

A line sensor 170 is placed at an emission-side focal position of the lens 169. A light-receiving portion of the line sensor 170 is placed on the light-convergent point formed by the lens 169.

With regard to the interfacial position measuring apparatus 508 constructed as shown above in the eighth embodiment, its operation is explained below.

Figure 31:
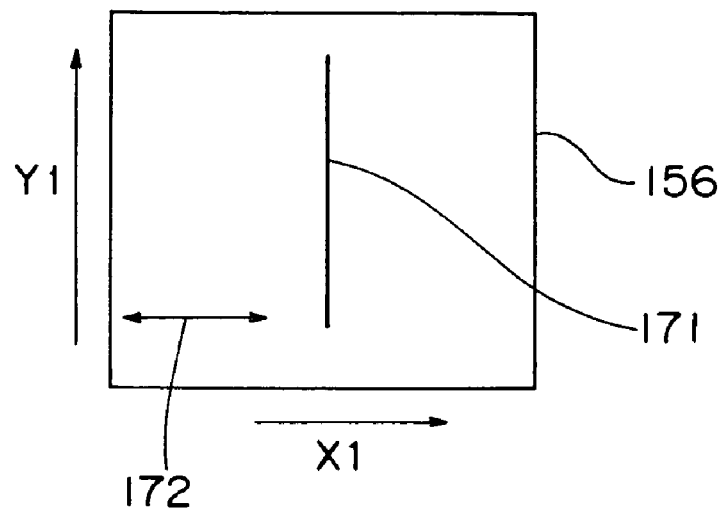
FIG. 31 is a view showing a light intensity pattern on a diffraction grating in the eighth embodiment.

Parallel light emitted from the light source 151, in a cross section vertical to the cylindrical axis of the cylindrical lens 154, is condensed by the cylindrical lens 154 and thereafter parallelized again by the lens 155. Meanwhile, in a cross section parallel to the cylindrical axis of the cylindrical lens, the light passes through the cylindrical lens 154, being condensed by the lens 155 onto the diffraction grating 156 placed at the focal position. Accordingly, a light-convergent line 171 is formed on the diffraction grating 156 as shown in FIG. 31. The resulting light-convergent line 171 is diffracted by the diffraction grating 156, being emitted toward the optical axis 157. An image of the light-convergent line 171 on the diffraction grating 156 formed at a proximity to the incidence-side focal position of the lens 158 is imaged by the lenses 158, 159 at a proximity to the focal position of the lens 159. The sample 110 is placed in proximity to the focal position of the lens 159, and a light-convergent line 162 is formed in the sample 110 so as to intersect measurement-object interfaces.

Figure 32:
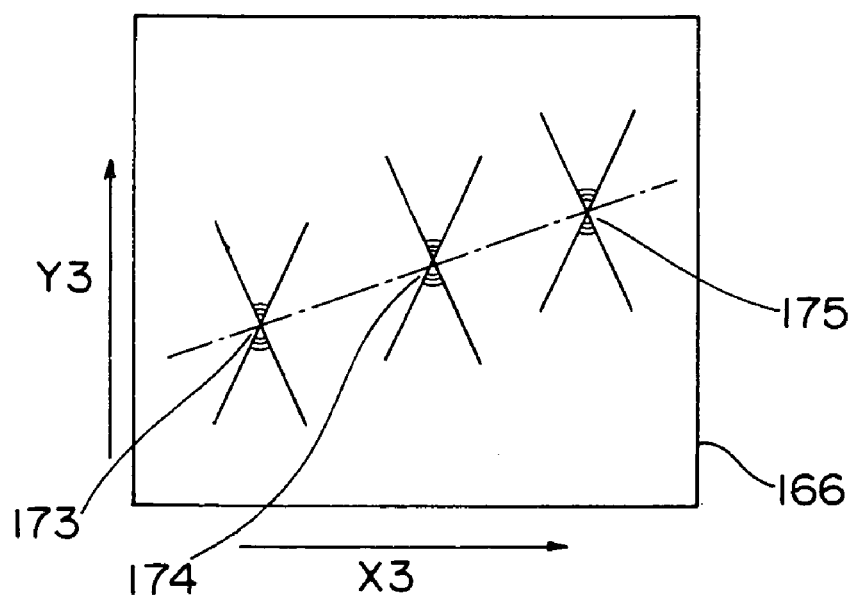
FIG. 32 is a view showing a light intensity pattern of reflected light on the diffraction grating in the eighth embodiment.

Reflected light from the interfaces are imaged by the lenses 163, 164 on the diffraction grating 166 at such a light intensity distribution as shown in FIG. 32. Reflected light by the first interface (surface) 117a of the sample 110 becomes incident on the lens 163 from a position distant from the optical axis 165 in FIG. 28, so that a light-convergent point 175 is formed in the positive direction of X3 also on the diffraction grating 166. Since reflected light by the second interface 117b is in proximity to the optical axis 165, a light-convergent point 174 is formed at a proximity to an intersection point between the diffraction grating 166 and the optical axis 165. Similarly, reflected light by the third interface 117c converges in the negative direction of X3, by which a light-convergent point 173 is formed. In this case, a distance between the light-convergent points is proportional to the distance between the interfaces of the sample 110.

Further, on the diffraction grating 156, the light-convergent line 171 in the Y1 direction is reflected by the interface so as to be imaged on the diffraction grating 166, forming an X-like pattern spreading in the Y3 direction on the diffraction grating 166. Therefore, on the diffraction grating 166, light-convergent points 173, 174, 175 by the individual interfaces do not overlap with one another.

Figure 33:
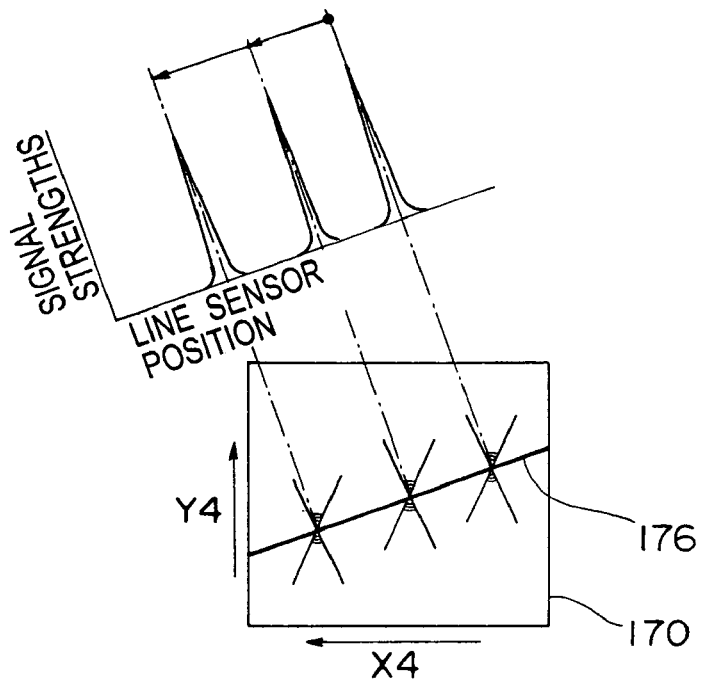
FIG. 33 is a view showing a light intensity pattern on a line sensor in the eighth embodiment.

The light-convergent points 173, 174, 175 formed on the diffraction grating 166 are magnified by the lenses 168, 169 so as to be imaged on the line sensor 170. The light-receiving portion of the line sensor 170 is placed on the move line 176 of light-convergent points by the interfaces as shown in FIG. 33, by which signals are obtained from the line sensor 170. Then, determining peak positions of the individual signals allows interfacial positions from the surface of the sample 110 to be detected.

The surface position can be detected, for example, by taking, as the surface position, the signal that is first detected when the sample 110 is brought from a position sufficiently distant from the sample-side focal position of the lens 109 closer thereto in steps. As for the calculation of interfacial positions from distances between the signal peaks, by preliminarily measuring a sample having known interface-to-interface optical distances and determining factors of interface-to-interface optical distances with respect to the resulting peak-to-peak distances of the signals, correct interfacial optical lengths from the surface can be obtained from the peak-to-peak distances of the signals with respect to any sample. Given a refractive index of a sample, individual interfacial distances from the sample surface can be calculated.

In comparison to the sixth embodiment, in this eighth embodiment, since an image of reflected light by the individual interfaces does not overlap with light-convergent points on the line sensor, noise in output signals of the line sensor can be reduced, so that measurement accuracy for interfacial positions can be improved. Also, by completely separating incident light on the sample and its reflected light from each other, light from the light source can be prevented from mixing directly into the light-receiving portion, allowing signal noise to be further reduced.

Ninth Embodiment

Figure 34:
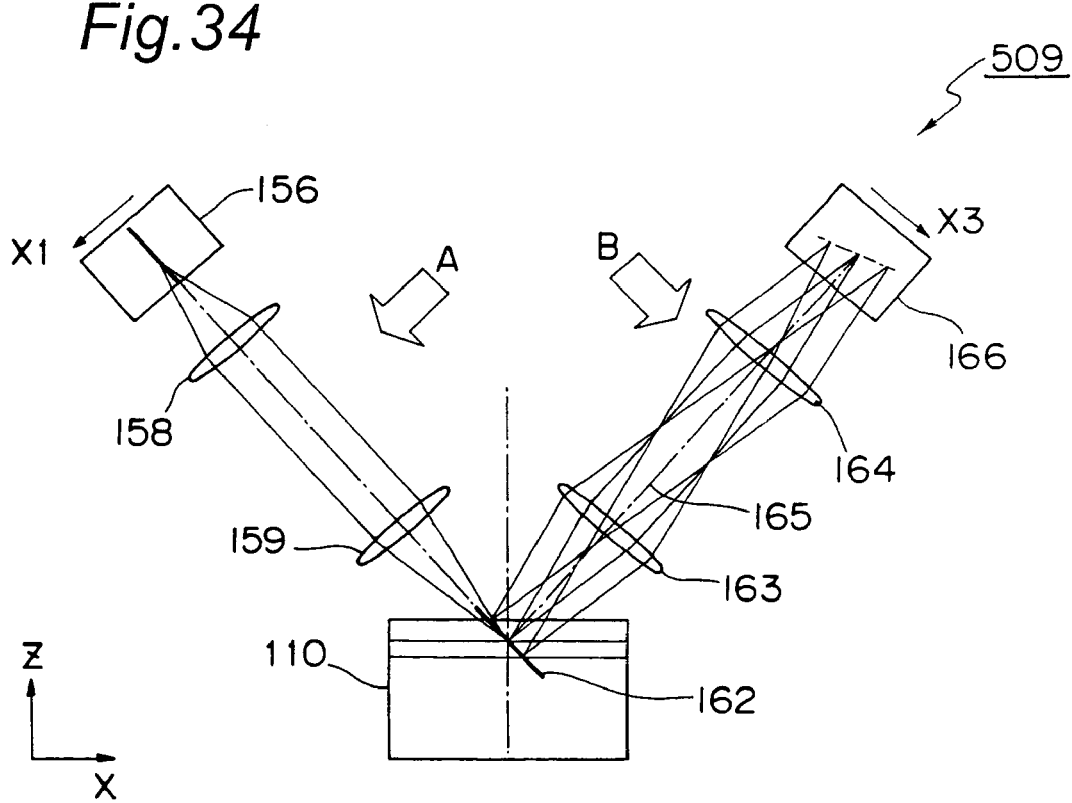
FIG. 34 is a schematic view of an interfacial position measuring apparatus according to a ninth embodiment of the invention.
Figure 35:
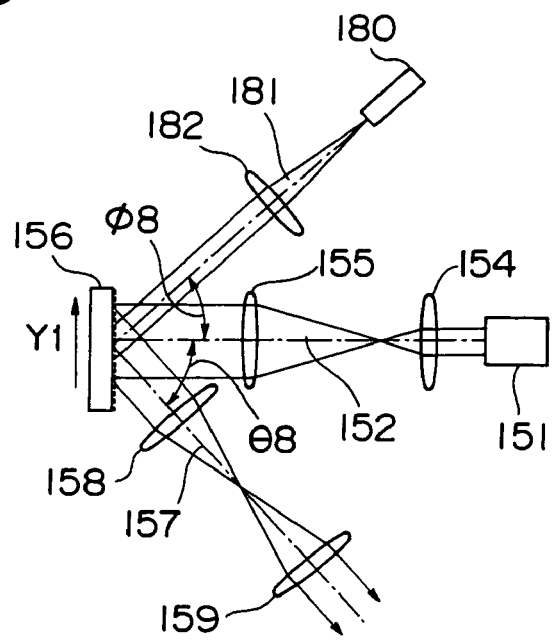
FIG. 35 is a view taken along an arrow A in the ninth embodiment.
Figure 36:
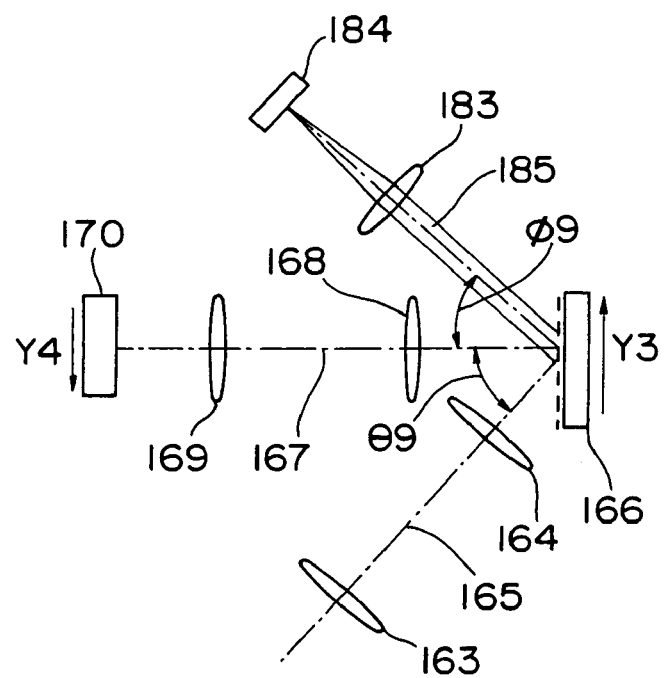
FIG. 36 is a view taken along an arrow B in the ninth embodiment.
Figure 37:
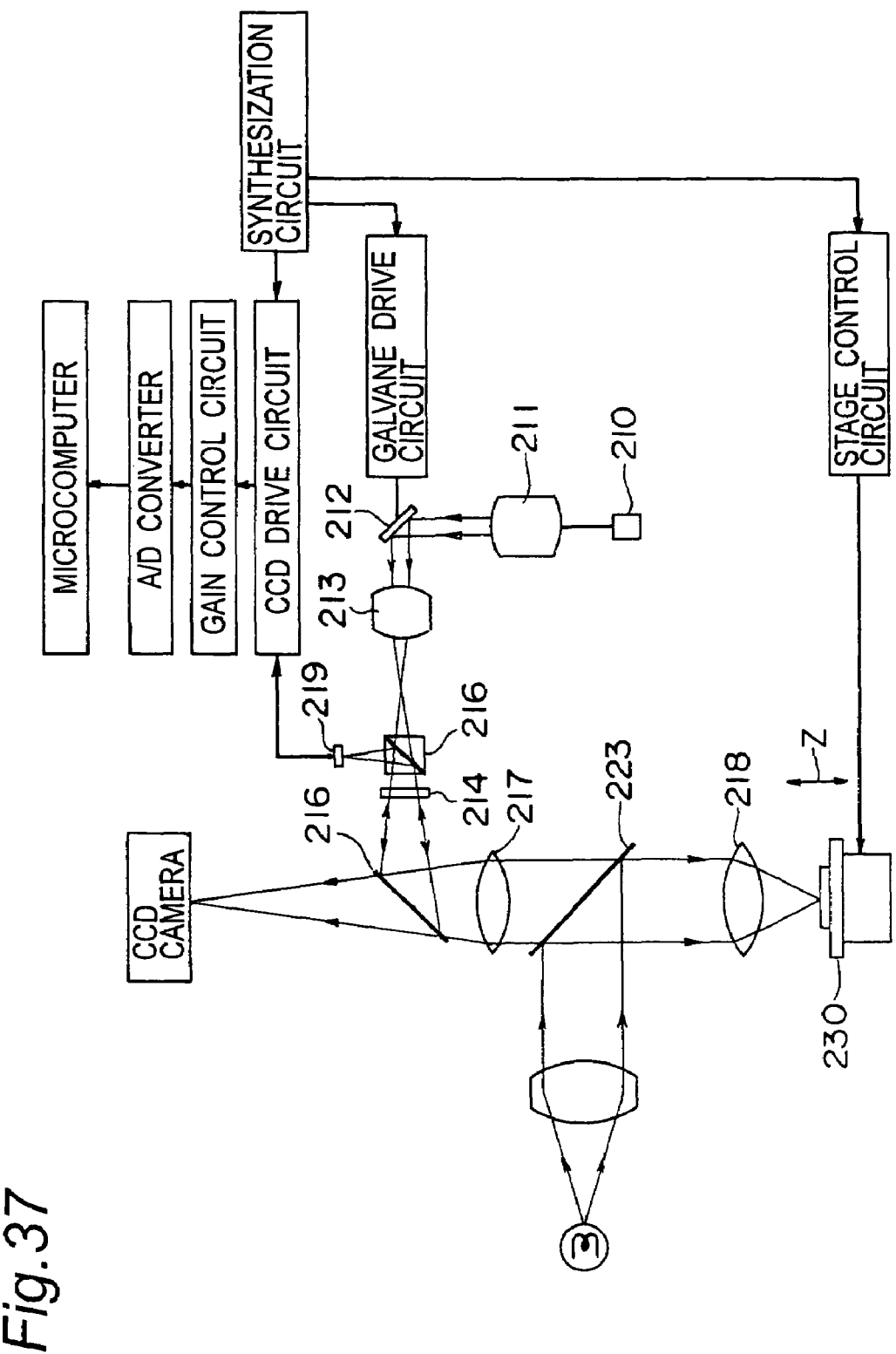
FIG. 37 is a view showing the configuration of an interfacial position measuring apparatus using a conventional optical microscope.

FIGS. 34 to 36 are schematic views of an interfacial position measuring apparatus 509 according to a ninth embodiment of the invention. FIG. 35 is a view taken along an arrow A of FIG. 34, and FIG. 36 is a view taken along an arrow B of FIG. 34.

A point light source 180, which is a monochromatic point light source different in wavelength from the light source 151, is a semiconductor laser as an example. The light source wavelength is assumed as $\lambda 2$.

An optical axis 181, which is within the drawing sheet of FIG. 35, passes through an intersection point between the optical axis 181 and the diffraction grating 156, forming an angle $\phi 8$ with respect to the optical axis 181, i.e., the normal line of the diffraction grating 156. In order that the optical axis 157 functions as regular reflection of the optical axis 181 with respect to the diffraction grating 156, it is assumed that $\phi 8 = \theta 8$.

A lens 182 parallelizes emission light of the light source 180.

An optical axis 185, which is within the drawing sheet of FIG. 36, passes through an intersection point between the optical axis 165 and the diffraction grating 166, forming an angle $\phi 9$ with respect to the optical axis 167, i.e., the normal line of the diffraction grating 166. In order that the optical axis 185 functions as regular reflection of the optical axis 165 with respect to the diffraction grating 166, it is assumed that $\phi 9 = \theta 9$.

A lens 183 has a lens center and a focal position both placed on the optical axis 185.

A position sensor 184, whose center is placed at the focal position of the lens 183, acts to measure positions of light-convergent points by the lens 183, and is given by a PSD, line sensor or the like as an example.

With regard to the interfacial position measuring apparatus 509 constructed as shown above, its measuring operation is explained below.

Emission light of the light source 180 is parallelized by the lens 182, going incident on the diffraction grating 156. The diffraction grating 156, which is optimized for the wavelength $\lambda$, allows a regular reflection component to occur for the wavelength $\lambda 2$, the light being reflected in the direction of the optical axis 157. Light emitted from the diffraction grating 156 passes through the lenses 158, 159, becoming parallel light again. Since the surface of the sample 110 and the internal interfaces are mutually parallel and flat, the reflected light results in parallel light angled by an angle two times larger than the inclination angle of the sample. Reflected light from the sample 110 passes again through the lenses 163, 164, being diffracted by the diffraction grating 166 and partly returned to proximities to the optical axis 185. In this case, the angle formed with the optical axis 185 is generally proportional to the inclination angle of the sample on condition that the inclination angle of the sample is a small one. The light that is reflected by the diffraction grating 166 and that has passed through the lens 183 converges onto the position sensor 184. Since the position of convergence on the position sensor 184 is generally proportional to the inclination angle of the sample surface, the inclination angle of the sample surface can be determined.

In the interfacial position measuring apparatus 509 of this ninth embodiment, position measurement of individual interfaces from the surface of the sample 110 is similar to that of the eighth embodiment. In the interfacial position measuring apparatus 508 of the eighth embodiment constructed of the light source 151 to the line sensor 170, since the distances from the surface to the individual interfacial positions are measured from positions of intersection points with the interfaces by making the light-convergent line 162 inclined with respect to the sample surface, an inclination of the sample 110 would cause errors in distance measured values from the sample surface to the individual interfaces. Therefore, by measuring an inclination amount of the sample measured by the light source 180 to the position sensor 184 and correcting the interfacial position measured values, such measurement errors can be reduced. As a correction method by using the sample inclination amount, a sample of known interface-to-interface optical distances is used, and variations of measured values relative to inclination amounts caused by inclination of the sample are preliminarily measured, by which inclination factors are acquired. Thus, for any arbitrary sample, interface-to-interface optical distances of less errors can be measured by measuring a sample inclination angle and multiplying the result by an inclination factor. Also, given a refractive index, interface-to-interface distances can be calculated.

Tenth Embodiment

Figure 38:
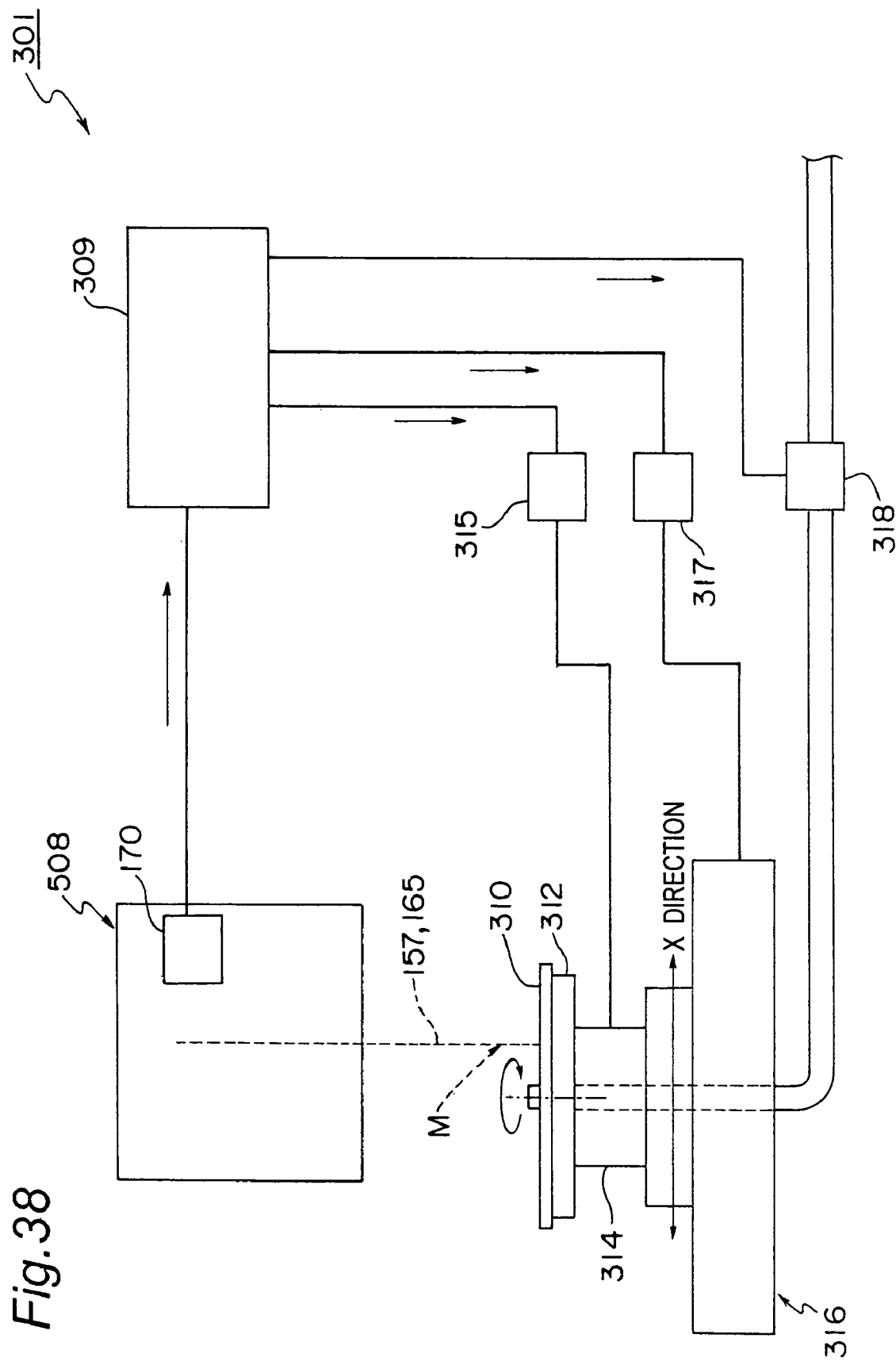
FIG. 38 is a schematic view showing the configuration of an optical-disc layer thickness measuring apparatus according to a tenth embodiment of the invention.

An embodiment in which the interfacial position measuring apparatus of the eighth embodiment is applied to an optical-disc layer thickness measuring apparatus is now described concretely. FIG. 38 shows a schematic view of an optical-disc layer thickness measuring apparatus 301 according to a tenth embodiment of the invention, in which the interfacial position measuring apparatus 508 of the eighth embodiment is included. Such an optical-disc layer thickness measuring apparatus 301 is an apparatus for measuring whether or not thicknesses of individual layers constituting an optical disc are formed within permissible ranges in manufacturing process for optical discs.

As shown in FIG. 38, the optical-disc layer thickness measuring apparatus 301 includes a suction table 312 for sucking and holding an optical disc 310 by its whole bottom face, a rotary table 314 for rotating the suction table 312 to thereby rotate the sucked-and-held optical disc 310 about its center serving as a rotational axis, and an X-axis stage 316 for moving the rotary table 314 in an X-axis direction in the figure, i.e., in the left-and-right direction of the drawing sheet of FIG. 38. The suction table 312, which has a disc placement surface formed into a generally circular shape like the optical disc 310, is so formed that its outer shape is slightly smaller than that of the optical disc 310. This is intended to prevent mis-measurements of the disc placement surface of the suction table 312 as the surface of the optical disc 310 in later-described layer thickness measurement.

Further, the interfacial position measuring apparatus 508 of the eighth embodiment is provided so as to be opposed to the optical disc 310 sucked and held by the suction table 312, where light emitted from the interfacial position measuring apparatus 508 is applied to the surface of the optical disc 310 along the optical axis 157 so that reflected light from the surface and individual interfaces is let to be incident on the line sensor 170 of the interfacial position measuring apparatus 508 along the optical axis 165. In FIG. 38, for simplicity of the schematic view, the optical axis 157 and the optical axis 165 are simplified to be illustrated in one optical axis and shown as a measurement position M.

The optical-disc layer thickness measuring apparatus 301 includes a control unit 309 for controlling measuring operation by the interfacial position measuring apparatus 508. The control unit 309 includes an interfacial position calculating means for receiving light intensity distribution data in the line sensor 170 as its input and calculating interfacial positions based on those data, a layer thickness measuring means for measuring layer thicknesses based on the interfacial positions, and a defective disc determining means for comparing measurement results obtained by the layer thickness measuring means with preset permissible values of layer thickness to determine optical discs having a layer thickness exceeding the permissible value as defective discs. Reference numeral 315 denotes a motor controller for the rotary table, and 317 denotes a motor controller for the X-axis stage. These controllers 315, 317 are controlled by the control unit 309, by which the measurement position M of the interfacial position measuring apparatus 508 can be scanned on the surface of the optical disc 310. In addition, denoted by 318 is a vacuum valve, the opening and closing operation of which is controlled by the control unit 309, by which the suction and holding/releasing of holding of the optical disc 310 by the suction table 312 is controlled.

In the optical-disc layer thickness measuring apparatus 301 constructed as described above, layer thickness measurement operation with the optical disc 310 is explained below.

First, as shown in FIG. 38, an optical disc 310 as a measurement object (sample) is set on the suction table 312, and sucked and held. Next, a rotating operation of the suction table 312 is started by the rotary table 314, so that the sucked-and-held optical disc 310 is rotated at a specified rotational speed.

Figure 39:
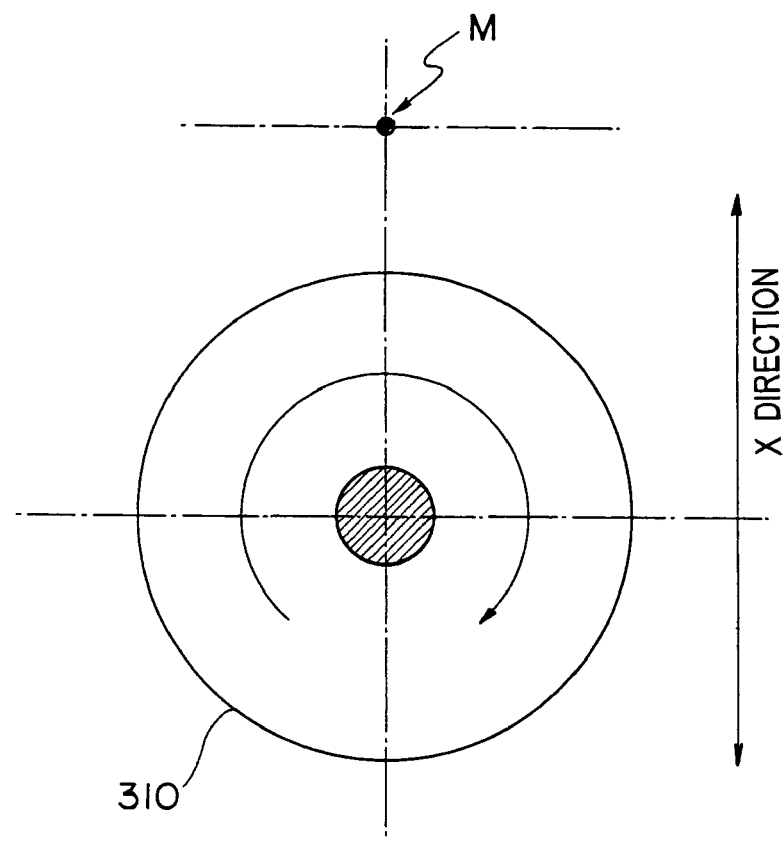
FIG. 39 is an explanatory view of layer thickness measuring operation in the layer thickness measuring apparatus of the tenth embodiment.

In such a state, as shown in FIG. 39, the X-axis stage 316 is moved in the X-axis direction, so that the measurement position M of the interfacial position measuring apparatus 508 is moved in the X-axis direction. More specifically, as shown in the schematic view of FIG. 40, move path and speed of the X-axis stage 316 are controlled so that the measurement position M passes through a spiral measurement track 308 on the surface. of the optical disc 310.

Further, while the measurement position M is being moved along the spiral measurement track 308, emission of light and incidence onto the line sensor 170 are continuously executed. This measurement result information is inputted to the control unit 309, and a comparison between preset layer-thickness permissible values and the measurement result is made, by which, for example, conformity or nonconformity of the optical disc 310 is determined. By such execution as to the conformity or nonconformity or the like, it becomes implementable to take proper measures such as removing or discarding optical discs that have been determined as defective discs, for example, in manufacturing process of optical discs, so that efficient manufacturing process can be fulfilled.

Eleventh Embodiment

Figure 41:
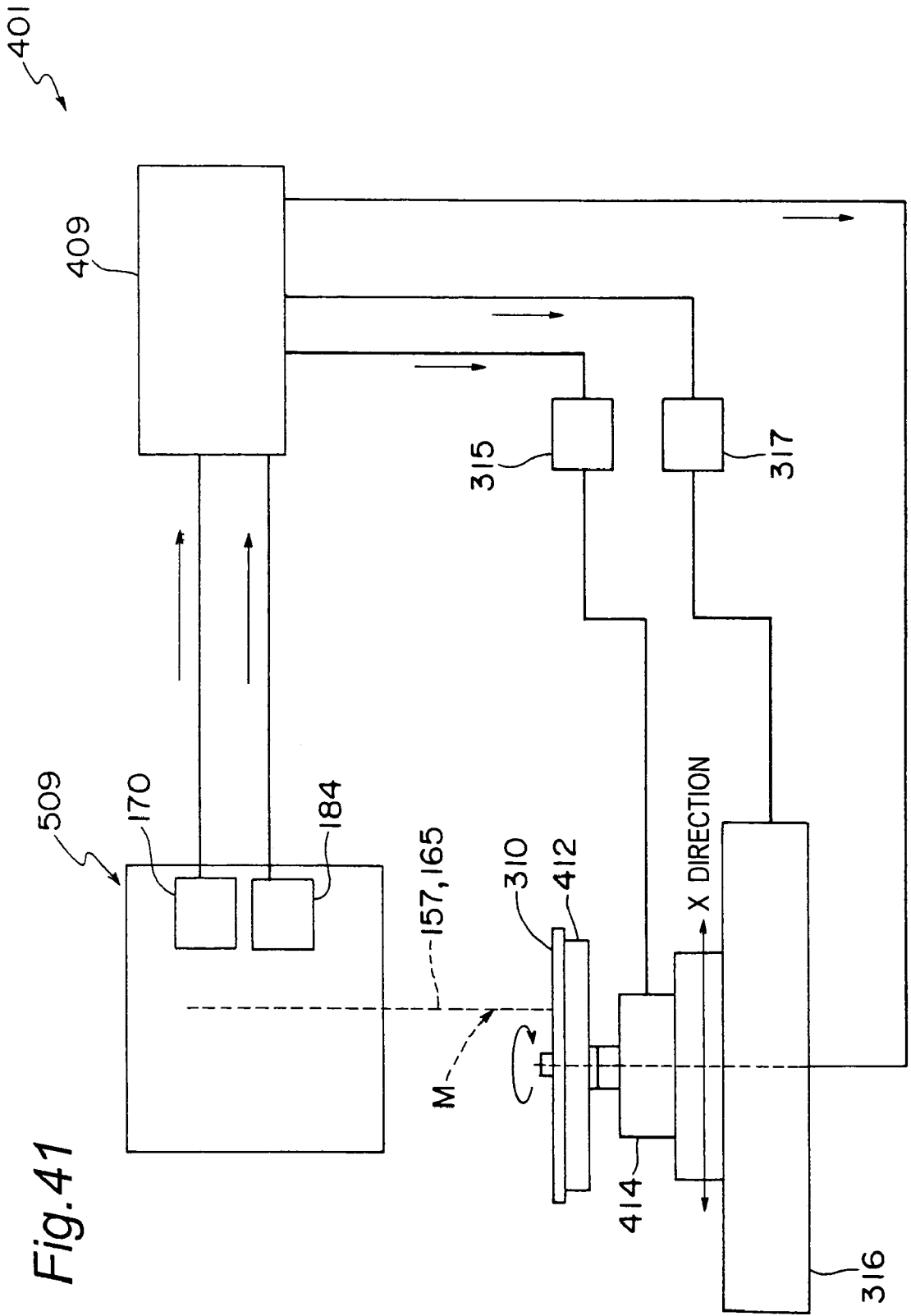
FIG. 41 is a schematic view showing the configuration of an optical-disc layer thickness measuring apparatus according to an eleventh embodiment of the invention.

Next, FIG. 41 shows a schematic view of an optical-disc layer thickness measuring apparatus 401 according to an eleventh embodiment of the invention. In the optical-disc layer thickness measuring apparatus 301 of the foregoing tenth embodiment, the optical disc 310 is sucked and held to the generally whole surface of the suction table 312 so that shakes of the disc surface, which could occur during the rotation, can be prevented. In contrast to this, in the optical-disc layer thickness measuring apparatus 401 of this eleventh embodiment, the interfacial position measuring apparatus 509 of the ninth embodiment is included so that the layer thickness measurement is fulfilled and, moreover, an inclination of the optical disc 310 at the measurement position is measured and, based on the resulting inclination measured value, a layer thickness measured value is corrected. It is noted that the same component members as in the layer thickness measuring apparatus 301 of FIG. 38 are designated by the same reference numerals and their description is omitted.

As shown in FIG. 41, the optical-disc layer thickness measuring apparatus 401 includes a holding table 412 and a rotary table 414, where the holding table 412 differs in structure from the suction table 312 of the tenth embodiment in that the set optical disc 310 is held, for example, by mechanical engagement and not by suction. Also, in the interfacial position measuring apparatus 509, light is applied to a surface of the optical disc 310 along the optical axis 157, reflected light from the surface or interfaces is let to be incident on and captured into the line sensor 170 along the optical axis 165, thus allowing the measurement of interfacial positions, i.e. layer thicknesses, to be done. Moreover, light is captured also into an inclination sensor 184 so that an inclination state of the optical disc 310 at the measurement position is detected.

Figure 40:
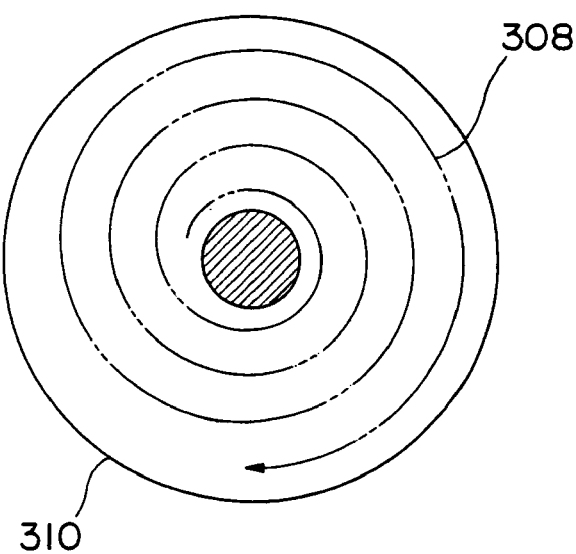
FIG. 40 is an explanatory view of layer thickness measuring operation in the layer thickness measuring apparatus of the tenth embodiment.

More specifically, as shown in FIGS. 39 and 40, layer thickness measurement is executed while a measurement position M is scanned with a spiral track 308 on the surface of the optical disc 310, and moreover inclination states of the optical disc 310 at individual measurement positions are measured by the inclination sensor 184. Distribution information as to the light intensity by the line sensor 170, as well as inclination state information by the inclination sensor 184, are inputted to a control unit 409 as they are associated with the information about their corresponding measurement position M. Then, in the control unit 409, layer thickness measurement results calculated from the light intensity distribution information are corrected based on the information on the inclination state, where corrected layer thickness measurement results are retained as measurement results that can be outputted.

In the layer thickness measuring apparatus 401 of the eleventh embodiment, since layer thickness measurement results are corrected depending on the angular state, layer thicknesses can reliably be measured and its measurement accuracy can be enhanced while high-speed measurement is fulfilled, even in cases where the disc surface is subject to shakes.

In addition, a light source whose emission light is sufficiently parallelized may be applied as the light source, and LEDs, halogen lamps, high-pressure mercury-vapor lamps, xenon lamps or other incoherent light sources whose emission light is modified by filter into monochromatic and parallel light may be also provided.

The Fresnel cylindrical lens may be replaced with cylindrical lenses only if those are capable of solving the issues of lens thickness and the like.

Further, the Fresnel cylindrical lens may be replaced with a zone plate or other diffraction flat lenses.

Although the inclination angle θ of the Fresnel cylindrical lens is set as 0<θ<90°, where the counterclockwise direction is assumed as a positive direction, yet there are no contradictions even if it is set that 0<θ<90°, where the clockwise direction is assumed as a positive direction.

Moreover, instead of the Fresnel cylindrical lens, spherical cylindrical lenses may be used with their lens numerical aperture set smaller.

Although the opening configuration of the slit plate is rectangular shaped in the above description, yet this is not limitative.

As the lenses, combinational lenses may be used so that aberrations can be further reduced.

Although the light-receiving portion is provided by a line sensor, it is also possible to use an area sensor for detection of light intensity on the focal line of the cylindrical lens.

Although a plate half mirror is used in the above description, a cube-type mirror may also be used.

The width of the light-receiving surface of the line sensor in the Y-axis direction is set smaller than that of light-convergent points on the line sensor in the above description. However, slits which are similar or so in width to the light-convergent points may be placed on the light-receiving surface of the line sensor to limit the light.

Although the slit plate is placed on the light source side in the above description, yet the slit plate may also be placed on the incidence plane or emission plane of the Fresnel cylindrical lens. Otherwise, the slit plate may be placed on the incidence plane or emission plane of the cylindrical lens.

Although the transmission type diffraction grating is placed parallel to the sample surface in the above description, yet it may also be placed so as to be inclined. Even with the diffraction grating inclined within the X-Z plane, the linear light-convergent point array 8 is formed within the sample, so that reflecting interfacial positions inside the sample can be measured as in the case of parallel placement.

In addition, although shifts of light-convergent point positions within the sample are prevented by the slit plate in the above description, yet shifts of the focal positions may also be prevented by preliminarily imparting an aberration, which is inverse to the spherical aberration occurring within the sample, to the pencils of light by a spherical aberration correction element instead of the slit plate. However, when spherical aberrations within the sample are corrected by a spherical aberration correction element, it is necessary to change the aberration amount depending on the distance between a light-convergent point array and the sample surface in the Z-axis direction. A method using the slit plate has no need for such dynamic aberration correction, contributing to simplification of the apparatus as well as reduction in cost.

Although the diffraction grating is provided by a blades type one in the above description, yet the diffraction grating may be provided by those having a rectangular-shaped cross section or sinusoidal-shaped cross section. However, the diffraction efficiency lowers with these configurations of diffraction gratings.

Although the first-order diffracted light is used in the above description, yet second- or higher-order diffracted light may also be used. However, the diffraction efficiency lowers with the use of higher-order diffracted light.

Furthermore, measurement of the inclination angle of the sample surface may be carried out by applying laser light diagonally to the sample and performing measurements with angular changes of reflected light.

For the measurement of the inclination angle of the sample surface, a light source different in wavelength from the light source used in the film thickness measurement of the sample may be used, and light for film thickness measurement and light for sample inclination angle measurement may be separated from each other by a wavelength filter.

As the light source, He—Ne lasers, LEDs, mercury lamps or the like may also be used.

Furthermore, there is a likelihood that materials constituting the layers, transmissivities of the layers, or rates of content of impurities in the layers can be estimated from the intensity level of the light reflected by the substrate.

The sample may be provided by a laminate of light-pervious substrates having different refractive indices. Otherwise, the sample may have air layers. In this case, refractive angle and emission angle can be determined from the incident angle by Snell's law on the basis of refractive indices of the individual layers.

The angle φ may be set so as to satisfy a grating equation $\sin\omega - \sin\theta = \lambda/p$ for the wavelength λ with a view to setting the diffraction direction along the optical axis.

Furthermore, light incident on the diffraction grating from the light source and return light from the diffraction grating may be separated from each other by using a λ/4 wave plate and a polarization beam splitter. In this case, the light efficiency is improved.

Further, the lens may be provided by a cylindrical lens, where only the inclination direction within the drawing sheet of the sample can be measured.

Although the light-convergent line formed on the diffraction grating is placed along the lattice trench direction and the vertical direction in the above description, yet the light-convergent line may have a slight angle. However, in the sixth embodiment and the seventh embodiment, parallelism between the lattice trench direction and the light-convergent line makes it impossible to perform the measurement. In the eighth embodiment and the ninth embodiment, although the measurement can be achieved even if the lattice trench direction and the light-convergent line are parallel to each other, yet there occurs signal noise due to the overlapping of their respective light-convergent points with the interfacial reflection.

The diffraction gratings of the sixth to ninth embodiments may be provided by using transmission type diffraction gratings. In this case, however, there is a need for correction of aberrations due to the thickness of the grating substrate.

According to the interfacial position measuring method, the layer thickness measuring method and the optical disc manufacturing method of the present invention, interfacial positions of a sample can be measured at high speed and with high accuracy, hence those methods being applicable also to layer thickness measurement of multilayer substrates or boards such as optical discs and multilayer films.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application No. 2005-369635 filed on Dec. 22, 2005 including specification, drawing and claims are incorporated herein by reference in its entirety.

What is claimed is:

1. An interfacial position measuring method comprising:
   emitting light to a substrate in which a plurality of optically transparent layers are laminated;
   placing a plurality of light-convergent points formed by the said emitted light onto different coordinates, respectively, in an X direction parallel to a surface of the substrate and a Z direction vertical to the surface of the substrate; and
   then, measuring light intensities of reflected light of the said emitted light and reflected within the substrate, and determining a position having a light intensity exceeding a threshold value as an interfacial position between the layers.

2. The interfacial position measuring method as defined in claim 1, wherein the plurality of light-convergent points formed by the said emitted light are placed at even intervals in the Z direction.

3. The interfacial position measuring method as defined in claim 1, wherein the light-convergent points formed by the emitted light are placed at their respective positions separate from the substrate in the Z direction, at least one light-convergent point for each one position.

4. The interfacial position measuring method as defined in claim 1, wherein the plurality of light-convergent points are so placed that an optical path length of the emitted light becomes equal among all the plurality of light-convergent points.

5. The interfacial position measuring method as defined in claim 1, wherein a linear light-convergent point array formed by the plurality of light-convergent points is placed so as to intersect the layers.

6. The interfacial position measuring method as defined in claim 1, wherein the plurality of light-convergent points are so placed that an interval of the light-convergent points in the Z direction becomes equal to a preset interface-to-interface distance.

7. The interfacial position measuring method as defined in claim 1, wherein after the emitted light is reflected or transmitted by a diffraction grating, the plurality of light-convergent points are placed within the substrate.

8. The interfacial position measuring method as defined in claim 1, wherein the emitted light is split into two pencils of light having optical axes parallel to each other, and thereafter applying the two pencils of light to the substrate.

9. An interfacial position measuring method comprising:
   emitting light so that a plurality of first light-convergent points are placed on a diffraction grating;
   placing a plurality of second light-convergent points formed by diffracted light of the plurality of first light-convergent points diffracted by the diffraction grating onto different coordinates, respectively, in an X direction parallel to a surface of the substrate in which a plurality of optically transparent layers are laminated, and a Z direction vertical to the surface of the substrate; and
   then, measuring light intensities of reflected light of the light from the diffraction grating and reflected within the substrate, and determining a position having a light intensity exceeding a threshold value as an interfacial position between the layers.

10. A layer thickness measuring method comprising:
emitting light to a substrate in which a plurality of optically transparent layers are laminated;
placing a plurality of light-convergent points formed by the said emitted light onto different coordinates, respectively, in an X direction parallel to a surface of the substrate and a Z direction vertical to the surface of the substrate;
then, measuring light intensities of reflected light of the said emitted light and reflected within the substrate, and determining a position having a light intensity exceeding a threshold value as an interfacial position between the layers; and
determining an interval between adjacent interfacial positions as a layer thickness of the substrate.

11. The layer thickness measuring method as defined in claim 10, further comprising:
measuring a relative angle between an optical axis of the said emitted light and the substrate surface, wherein
the layer thickness is determined based on the relative angle, the interval between the interfacial positions and refractive indices of the individual layers.

12. The layer thickness measuring method as defined in claim 10, further comprising:
measuring a relative angle of the optical axis and the substrate surface by using first light and second light applied to the substrate along an identical optical axis, wherein
the layer thickness is determined based on the relative angle, the interval between the interfacial positions and refractive indices of the individual layers.

13. An optical disc manufacturing method comprising:
with the substrate provided by an optical disc, after forming the plurality of layers on the optical disc, measuring a layer thickness of the optical disc by the layer thickness measuring method as defined in claim 10; and
if a measured layer thickness of the optical disc exceeds a threshold value, removing the optical disc from manufacturing process thereof.

14. An optical disc manufacturing method comprising:
with the substrate provided by an optical disc, after forming the plurality of layers on the optical disc, measuring a layer thickness of the optical disc by the layer thickness measuring method as defined in claim 10; and
if a measured layer thickness of the optical disc exceeds a threshold value, discarding the optical disc.

15. An interfacial position measuring apparatus, comprising:
a light source for emitting light to a substrate surface of a substrate having a plurality of optically transparent layers laminated therein;
a diffraction grating which is placed so as to be parallel and to be inclined with respect to an optical axis of the said emitted light, for diffracting the said emitted light so that a plurality of light-convergent points are formed by the diffracted light and placed within the substrate;
a measuring unit for measuring light intensities of reflected light and reflected within the substrate; and
a control unit for comparing the light intensities and a threshold value with each other.

16. An interfacial position measuring apparatus, comprising:
a light source for emitting light to a substrate having a plurality of optically transparent layers laminated therein;
a Fresnel lens which is placed between the light source and the substrate so as to be inclined with respect to the substrate surface and an optical axis of the light from the light source, for forming a plurality of light-convergent points by the light from the light source and placing the points within the substrate;
a measuring unit for measuring light intensities of reflected light and reflected within the substrate; and
a control unit for comparing the light intensities and a threshold value with each other.

17. An interfacial position measuring apparatus, comprising:
a light source for emitting light to a substrate having a plurality of optically transparent layers laminated therein;
a fan-shaped Fresnel lens which is placed between the light source and the substrate so as to be parallel to the substrate surface and inclined with respect to an optical axis of the light from the light source, for forming a plurality of light-convergent points by the said emitted light and placing the points within the substrate;
a measuring unit for measuring light intensities of reflected light and reflected within the substrate; and
a control unit for comparing the light intensities and a threshold value with each other.

18. A layer thickness measuring apparatus, comprising:
a light source for emitting light to be parallel to a substrate surface of a substrate having a plurality of optically transparent layers laminated therein;
a diffraction grating which is placed so as and to be inclined with respect to an optical axis of the said emitted light, for diffracting the said emitted light so that a plurality of light-convergent points are formed by the diffracted light and placed within the substrate;
a measuring unit for measuring light intensities of reflected light and reflected within the substrate; and
layer thickness measuring means for determining, as a layer thickness, a distance between interfaces of the substrate based on a position having a light intensity exceeding a threshold value, an angle formed by the optical axis of the light from the light source and the surface of the substrate, and refractive indices of the layers.

19. An optical disc manufacturing apparatus, comprising:
a holding unit for holding an optical disc;
the layer thickness measuring apparatus as defined in claim 18 for measuring the layer thickness of the optical disc as the substrate held by the holding unit; and
disc determining means for determining a state of an optical disc by comparing the layer thickness measured by the layer thickness measuring apparatus and a threshold value with each other.

* * * * *